United States Patent
Dong et al.

(10) Patent No.: US 11,460,735 B2
(45) Date of Patent: Oct. 4, 2022

(54) DISPLAY PANEL AND PREPARATION METHOD THEREOF, AND DISPLAY APPARATUS

(71) Applicant: BOE Technology Group Co., Ltd., Beijing (CN)

(72) Inventors: Liwen Dong, Beijing (CN); Qi Yao, Beijing (CN); Guangcai Yuan, Beijing (CN); Feng Zhang, Beijing (CN); Zhijun Lv, Beijing (CN); Wenqu Liu, Beijing (CN); Zhao Cui, Beijing (CN); Xiaoxin Song, Beijing (CN); Detian Meng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/244,979

(22) Filed: Apr. 30, 2021

(65) Prior Publication Data
US 2022/0113587 A1    Apr. 14, 2022

(30) Foreign Application Priority Data
Oct. 14, 2020    (CN) .......................... 202011099086.X

(51) Int. Cl.
*G02F 1/1339*    (2006.01)
*G02F 1/13357*    (2006.01)
(Continued)

(52) U.S. Cl.
CPC ....... *G02F 1/13394* (2013.01); *G02B 6/0016* (2013.01); *G02F 1/133512* (2013.01);
(Continued)

(58) Field of Classification Search
None
See application file for complete search history.

(56) References Cited

U.S. PATENT DOCUMENTS

2002/0012083 A1* 1/2002 Tanaka .............. G02F 1/133514
349/106
2005/0105014 A1* 5/2005 Hong ................ G02F 1/133615
349/65
(Continued)

FOREIGN PATENT DOCUMENTS

CN    202013466 U    * 10/2011
CN    109212834 A    * 1/2019 ............. G02B 6/005

*Primary Examiner* — Shan Liu
(74) *Attorney, Agent, or Firm* — Ling Wu; Stephen Yang; Ling and Yang Intellectual Property

(57) ABSTRACT

Provided are a display panel and a preparation method thereof, and a display apparatus. The display panel includes a first substrate and a second substrate which are aligned and combined into a cell, wherein the first substrate includes a backlight structure layer and an array structure layer arranged on a side of the backlight structure layer facing the second substrate, the backlight structure layer includes a light guide plate, a grating layer arranged on a side of the light guide plate facing the array structure layer and a refractive layer covering the grating layer, the grating layer includes a plurality of grating units, the array structure layer includes a plurality of pixel electrodes, and the grating units are in one-to-one correspondence with the pixel electrodes.

20 Claims, 10 Drawing Sheets

(51) Int. Cl.
*G02F 1/1335* (2006.01)
*F21V 8/00* (2006.01)
(52) U.S. Cl.
CPC .. *G02F 1/133514* (2013.01); *G02F 1/133548* (2021.01); *G02F 1/133602* (2013.01)

(56) References Cited

U.S. PATENT DOCUMENTS

| | | | |
|---|---|---|---|
| 2009/0273744 A1* | 11/2009 | Wang | G02F 1/133528 427/457 |
| 2011/0228190 A1* | 9/2011 | Yang | G02F 1/13394 349/56 |
| 2014/0070239 A1* | 3/2014 | Yang | H01L 33/08 438/34 |
| 2018/0136504 A1* | 5/2018 | Wang | G02F 1/1339 |
| 2018/0196304 A1* | 7/2018 | Zha | G02F 1/1335 |
| 2018/0196308 A1* | 7/2018 | Xu | G02F 1/133514 |
| 2019/0101783 A1* | 4/2019 | Bi | G02F 1/13392 |
| 2019/0121194 A1* | 4/2019 | Park | G02F 1/133502 |
| 2020/0117039 A1* | 4/2020 | Wu | G02F 1/13394 |

* cited by examiner

DISPLAY PANEL AND PREPARATION METHOD THEREOF, AND DISPLAY APPARATUS

The present application claims the priority of Chinese Patent Application No. 202011099086.X, filed to the CNIPA on Oct. 14, 2020, the content of which is hereby incorporated by reference.

TECHNICAL FIELD

Embodiments of the present disclosure relate to, but are not limited to, the field of display technology, and particularly relate to a display panel and a preparation method thereof, and a display apparatus.

BACKGROUND

Liquid Crystal Display (LCD) has been widely used as a high-quality display screen because it may realize large screen and high precision.

Organic Liquid Crystal Display (OLCD), as an implementation of flexible display technology, has the same working principle as conventional LCD. OLCD is based on flexible low-temperature Organic Thin Film Transistor (OTFT) technology, and uses plastics such as triacetate fiber pixels (TAC) film or polymethyl methacrylate (PET) film as the substrate. Therefore, OLCD has better ductility slimmer, is thinner and lighter, and may adapt to various surfaces. However, polarizers and phase difference plates in the backlight structure of OLCD will lead to poor flexibility of OLCD, which limits its application prospect.

SUMMARY

The following is a summary of subject matter described in detail herein. This summary is not intended to limit the protection scope of the claims.

An embodiment of the present disclosure provides a display panel, including a first substrate and a second substrate which are aligned and combined into a cell, wherein the first substrate includes a backlight structure layer and an array structure layer arranged on a side of the backlight structure layer facing the second substrate, the backlight structure layer includes a light guide plate, a grating layer arranged on a side of the light guide plate facing the array structure layer and a refractive layer covering the grating layer, the grating layer includes a plurality of grating units, the array structure layer includes a plurality of pixel electrodes, and the grating units are in one-to-one correspondence with the pixel electrodes.

An embodiment of the present disclosure provides a display apparatus, including the display panel provided in the aforementioned embodiment.

An embodiment of the present disclosure provides a preparation method of a display panel, including:

forming a first substrate including a backlight structure layer and an array structure layer arranged on the backlight structure layer, wherein the backlight structure layer includes a light guide plate, a grating layer arranged on a side of the light guide plate facing the array structure layer and a refractive layer covering the grating layer, the grating layer includes a plurality of grating units, the array structure layer includes a plurality of pixel electrodes, and the grating units are in one-to-one correspondence with the pixel electrodes;

forming a second substrate; and aligning and combining the first substrate and the second substrate into a cell, wherein the array structure layer is located between the backlight structure layer and the second substrate.

Other aspects will become apparent upon reading and understanding accompanying drawings and the detailed description.

BRIEF DESCRIPTION OF DRAWINGS

The attached drawings are used to provide a further understanding of the technical solution of the present disclosure, and constitute a part of the specification. They are used together with the embodiments of the present application to explain the technical solution of the present disclosure, and do not constitute a restriction on the technical solution of the present disclosure.

DETAILED DESCRIPTION

Figure 1:
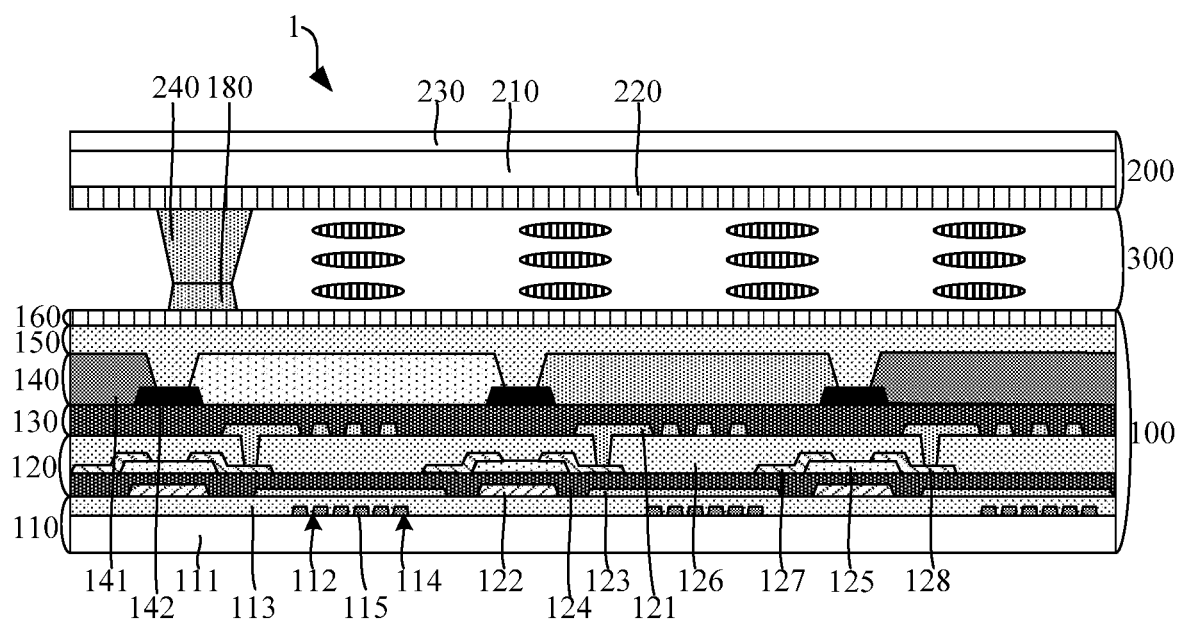
FIG. 1 is a structural diagram of a display panel according to an exemplary embodiment of the present disclosure.

Embodiments of the present disclosure may be implemented in a number of different ways. Those of ordinary skills in the art will readily understand the fact that implementations and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of a constituent element, or a thickness of a layer or an area, is sometimes exaggerated for clarity. Therefore, an implementation of the present disclosure is not necessarily limited to the size shown, and the shape and size of components in the drawings do not reflect true proportions. In addition, an implementation of the present disclosure is not limited to the shapes or values shown in the accompanying drawings.

The ordinal numbers "first", "second", "third" and the like in this specification are used to avoid confusion between constituent elements, but not to constitute limitations on quantities.

In this specification, for sake of convenience, wordings such as "central", "upper", "lower", "front", "rear", "vertical", "horizontal", "top", "bottom", "inner", "outer" and the like describe the orientation or positional relations of constituent elements with reference to the drawings, which are only for ease of description in this specification and for simplification of the description, rather than indicating or implying that the apparatus or element referred to must have a specific orientation, or must be constructed and operated in a particular orientation, and therefore may not be construed as limitations on the present disclosure. The positional relations of the constituent elements may be appropriately changed according to the direction in which constituent elements are described. Therefore, they are not limited to the wordings in the specification, and may be replaced appropriately according to the situations.

In this specification, terms "install", "connect" and "couple" shall be understood in a broad sense unless otherwise explicitly specified and defined. For example, a connection may be a fixed connection, or may be a detachable connection, or an integrated connection; it may be a mechanical connection, or may be an electrical connection; it may be a direct connection, or may be an indirect connection through middleware, or may be an internal connection between two elements. Those of ordinary skills in the art may understand the specific meanings of the above mentioned terms in the present disclosure according to specific context.

In this specification, "parallel" refers to a state in which two straight lines form an angle above −10 degrees and below 10 degrees, and thus also includes a state in which the angle is above −5 degrees and below 5 degrees. In addition, "vertical" refers to a state in which an angle formed by two straight lines is 80 degrees or more and 100 degrees or less, and thus includes a state in which the angle is 85 degrees or more and 95 degrees or less.

In this specification, "film" and "layer" are interchangeable. For example, sometimes a "conductive layer" may be replaced with a "conductive film". Similarly, an "insulating film" may sometimes be replaced with an "insulating layer".

An embodiment of the present disclosure provides a display panel, including a first substrate and a second substrate which are aligned and combined into a cell, wherein the first substrate includes a backlight structure layer and an array structure layer arranged on a side of the backlight structure layer facing the second substrate, the backlight structure layer includes a light guide plate, a grating layer arranged on a side of the light guide plate facing the array structure layer and a refractive layer covering the grating layer, the grating layer includes a plurality of grating units, the array structure layer includes a plurality of pixel electrodes, and the grating units are in one-to-one correspondence with the pixel electrodes.

According to the display panel provided by an embodiment of the present disclosure, the grating layer and the refractive layer covering the grating layer are arranged on the light guide plate, and the grating layer includes a plurality of grating units, and the grating units may selectively extract the light inside the light guide plate and form collimated polarized light, so that a polarizer and a phase difference plate are not needed in the backlight structure, thereby improving the flexibility of the display panel.

A technical solution of a display panel according to an exemplary embodiment of the present disclosure will be exemplarily illustrated below with reference to the accompanying drawings.

Figure 2:
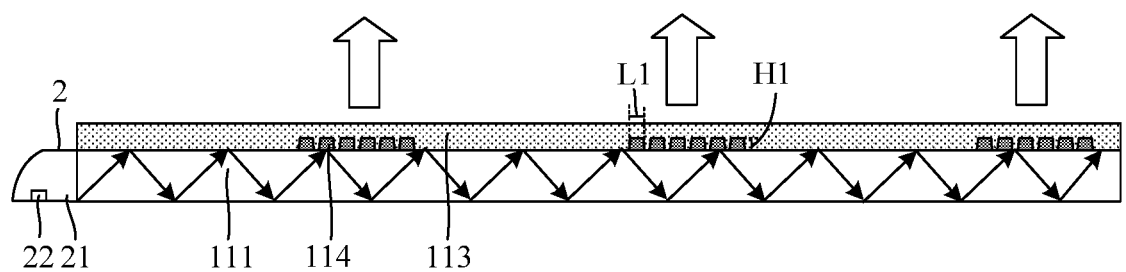
FIG. 2 is a schematic diagram of light emission from a backlight structure layer according to an exemplary embodiment of the present disclosure.

FIG. 1 is a structural diagram of a display panel according to an exemplary embodiment of the present disclosure, and FIG. 2 is a schematic diagram of light emission from a backlight structure layer according to an exemplary embodiment of the present disclosure. In some exemplary embodiments, as shown in FIG. 1, the display panel 1 includes a first substrate 100 and a second substrate 200 which are aligned and combined into a cell. The first substrate 100 includes a backlight structure layer 110 and an array structure layer 120 arranged on a side of the backlight structure layer 110 facing the second substrate 200. The backlight structure layer 110 includes a light guide plate 111, a grating layer 112 arranged on a side of the light guide plate 111 facing the array structure layer 120, and a refractive layer 113 covering the grating layer 112. The grating layer 112 includes a plurality of grating elements 114, which may be distributed in an array. The array structure layer 120 includes a plurality of pixel electrodes 121, which may be distributed in an array. The grating units 114 are in one-to-one correspondence with the pixel electrodes 121. As shown in FIG. 2, the light of the backlight 2 is incident from a side of the light guide plate 111 and totally reflected inside the light guide plate 111 under the action of the refractive layer 113. The grating units 114 are arranged to selectively extract the light inside the light guide plate 111 and form collimated polarized light, which is incident on the pixel electrodes 121 corresponding to the grating units 114. The backlight 2 may include a reflective cover 21 and a light emitting diode 22 arranged in the reflective cover 21, and the light of the light emitting diode 22 enters the light guide plate 111 after being reflected and coupled by the reflective cover 21.

According to the display panel 1 provided by an exemplary embodiment of the present disclosure, the grating layer 112 and the refractive layer 113 covering the grating layer 112 are arranged on the light guide plate 111, the grating layer 112 includes a plurality of grating units 114 which may selectively extract the light inside the light guide plate 111 and form collimated polarized light. Therefore, the backlight 2 does not need a polarizer and a phase difference plate, thereby improving the flexibility of the display panel 1.

In some exemplary embodiments, as shown in FIG. 1, an orthographic projection of the pixel electrodes 121 on the light guide plate 111 includes an orthographic projection of the grating units 114 on the light guide plate 111, which may be understood as that the orthographic projection of the pixel electrodes 121 on the light guide plate 111 coincides with the orthographic projection of the grating units 114 on the light guide plate 111, or may be understood as that the orthographic projection of the grating units 114 on the light guide plate 111 is smaller than the orthographic projection of the pixel electrodes 121 on the light guide plate 111, and is located within a range of the orthographic projection of the pixel electrodes 121 on the light guide plate 111.

In order to realize total reflection of the light of the backlight 2 in the light guide plate 111, in some exemplary embodiments, a refractive index of the refractive layer 113 is lower than that of the light guide plate 111. In an example, a ratio of the refractive index of the light guide plate 111 to the refractive index of the refractive layer 113 is 1.08 to 1.54. In another example, the refractive index of the light guide plate 111 is 1.4 to 1.7, and the refractive index of the refractive layer 113 is 1.1 to 1.3. In an example, taking the refractive index of the light guide plate 111 as 1.54 and the refractive index of the refractive layer 113 as 1.25 as an example, in order to realize the total reflection of the light of the backlight 2 in the light guide plate 111, an incident angle of the light of the backlight 2 is 65°. In some exemplary embodiments, the light guide plate 111 may be a flexible light guide plate. A material of the light guide plate 111 may be any one of cellulose acetate (TAC), polyimide (PI) and polymethylmethacrylate (PMMA), and other materials meeting the refractive index requirements may also be selected for the light guide plate 111, which are not listed here. The refractive layer 113 may be made of a resin material doped with nano silicon oxide (SiOX).

In some exemplary embodiments, as shown in FIGS. 1 and 2, the grating unit 114 includes a plurality of grid lines 115 arranged in parallel. In an example, if collimated polarized light is generated at the grating unit 114, that is, the emitting angle is 0°, a period of the grating unit 114 may be 150 nm to 600 nm, for example, 380 nm, a height H1 of the gate line 115 may be 200 nm to 400 nm, for example, 350 nm, and a line width L1 of the gate line 115 may be 200 nm to 300 nm, for example, 228 nm. A material of the grating unit 114 includes any one of aluminum, silver and gold. In an example, in order to improve the diffraction efficiency of the grating unit 114, the diffraction efficiency of the grating unit 114 may reach 20% to 30%, that is, 20% to 30% of the incident light is emitted as polarized light. The material of the grating unit 114 may be silicon nitride (Si3N4), and the refractive index of silicon nitride is 1.92.

In some exemplary embodiments, as shown in FIG. 1, the array structure layer 120 includes a gate electrode 122 and a common electrode 123 arranged on a side of the refractive layer 113 away from the light guide plate 111, a first insulating layer 124 covering the gate electrode 122 and the common electrode 123, an active layer 125 arranged on the first insulating layer 124, a source-drain metal layer arranged on the active layer 125 and a second insulating layer 126 covering the source-drain metal layer. The pixel electrodes 121 are arranged on the second insulating layer 126. The source-drain metal layer includes a source electrode 127 and a drain electrode 128. The second insulating layer 126 includes a via hole exposing the drain electrode 128, and the pixel electrode 121 is connected with the drain electrode 128 through the via hole. The second insulating layer 126 may also be referred to as an interlayer insulating layer. In an example, the array structure layer 120 may be an advanced dimension in switch (ADS) type, that is, the pixel electrodes 121 are slit electrodes, the common electrodes 123 are plate electrodes, and the pixel electrodes 121 are in one-to-one correspondence with the common electrodes 123. The orthographic projection of the pixel electrodes 121 on the light guide plate 111 overlaps with the orthographic projection of the common electrodes 123 on the light guide plate 111. Both the pixel electrodes 121 and the common electrodes 123 are transparent electrodes. The gate electrode 122 and the source-drain metal layer may be made of a metal such as aluminum, silver or copper. The first insulating layer 124 and the second insulating layer 126 may be made of a resin dielectric material, for example, Flexi OM™ series produced by Flex Enable company may be used. A material of the active layer 125 may be an organic material, for example, 3-hexylthiophene, polyfluorene-based polymer, polythiophene and the like.

Figure 3:
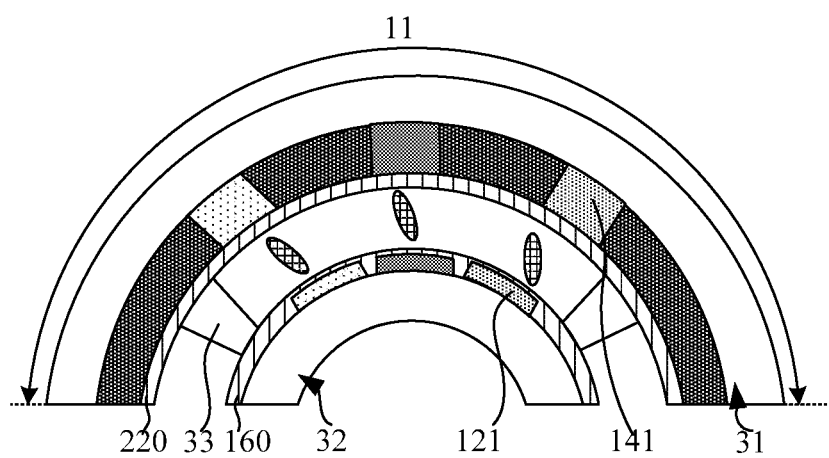
FIG. 3 is a schematic structural diagram of a positively bent organic liquid crystal display panel.
Figure 4:
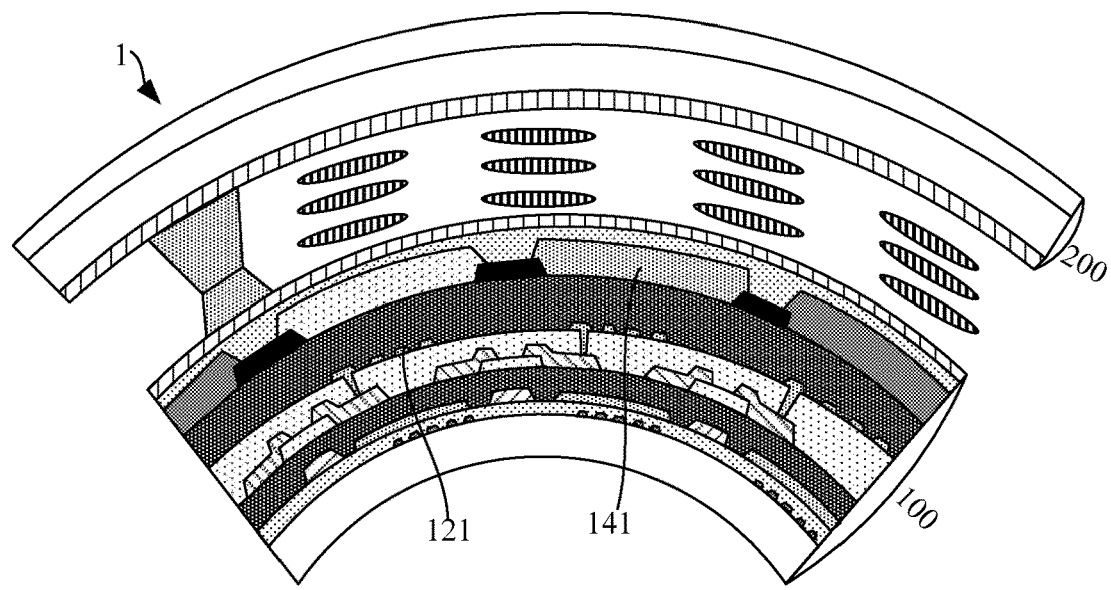
FIG. 4 is a schematic structural diagram of a display panel according to an exemplary embodiment of the present disclosure after being bent.

In some exemplary embodiments, as shown in FIG. 1, the first substrate 100 further includes a first flat layer 130 arranged on a side of the array structure layer 120 away from the backlight structure layer 110, a color filter structure layer 140 arranged on a side of the first flat layer 130 away from the array structure layer 120, a second flat layer 150 covering the color filter structure layer 140, and a first alignment layer 160 arranged on a side of the second flat layer 150 away from the color filter structure layer 140. The color filter structure layer 140 includes a plurality of color filter units 141 and a black matrix 142 arranged between the color filter units 141, and the color filter units 141 are in one-to-one correspondence with the pixel electrodes 121. The orthographic projection of the color film units 141 on the light guide plate 111 covers the orthographic projection of the pixel electrodes 121 on the light guide plate 111. FIG. 3 shows a schematic structural diagram of a positively bent organic liquid crystal display panel. The conventional organic liquid crystal display panel includes a color filter substrate 31 and an array substrate 32 which are aligned and combined into a cell. The color filter substrate 31 includes color filter units 141 arranged in an array, and the array substrate 32 includes pixel electrodes 121 in one-to-one correspondence with the color filter units 141. The so-called positive bending means that one side of the color filter substrate 31 is bent outward (as shown in FIG. 3), and in the bending area 11, the color filter substrate 31 is stretched, and the array substrate 32 is compressed. The organic liquid crystal display panel may also be bent negatively. The so-called negative bending means that one side of the color filter substrate 31 is bent inward, and in the bending area 11, the color filter substrate 31 is compressed and the array substrate 32 is stretched. As shown in FIG. 3, in the process of bending the organic liquid crystal display panel, the color filter substrate 31 in the bending area 11 of the organic liquid crystal display panel is stretched, the space between the color filter units 141 is enlarged, the array substrate 32 in the bending area 11 of the organic liquid crystal display panel is compressed, the space between the pixel electrodes 121 is reduced, there is a misalignment between the color filter units 141 and the corresponding pixel electrodes 121 in the bending area 11, the liquid crystal in the misaligned position cannot be affected by the electric field, and thus cannot control the light emitted from the backlight to this area, thereby leading to light leakage. FIG. 4 shows a schematic structural diagram of a display panel according to an exemplary embodiment of the present disclosure after being bent. In this example, as shown in FIG. 4, the color filter structure layer 140 is arranged on the array structure layer 120. After the display panel is bent, the color filter units 141 may correspond to the pixel electrodes 121, thereby effectively preventing the misalignment between the color filter units 141 and the corresponding pixel electrodes 121 after the display panel 1 is bent, avoiding light leakage after the display panel 1 is bent, and improving the display quality of the display panel 1.

Figure 5:
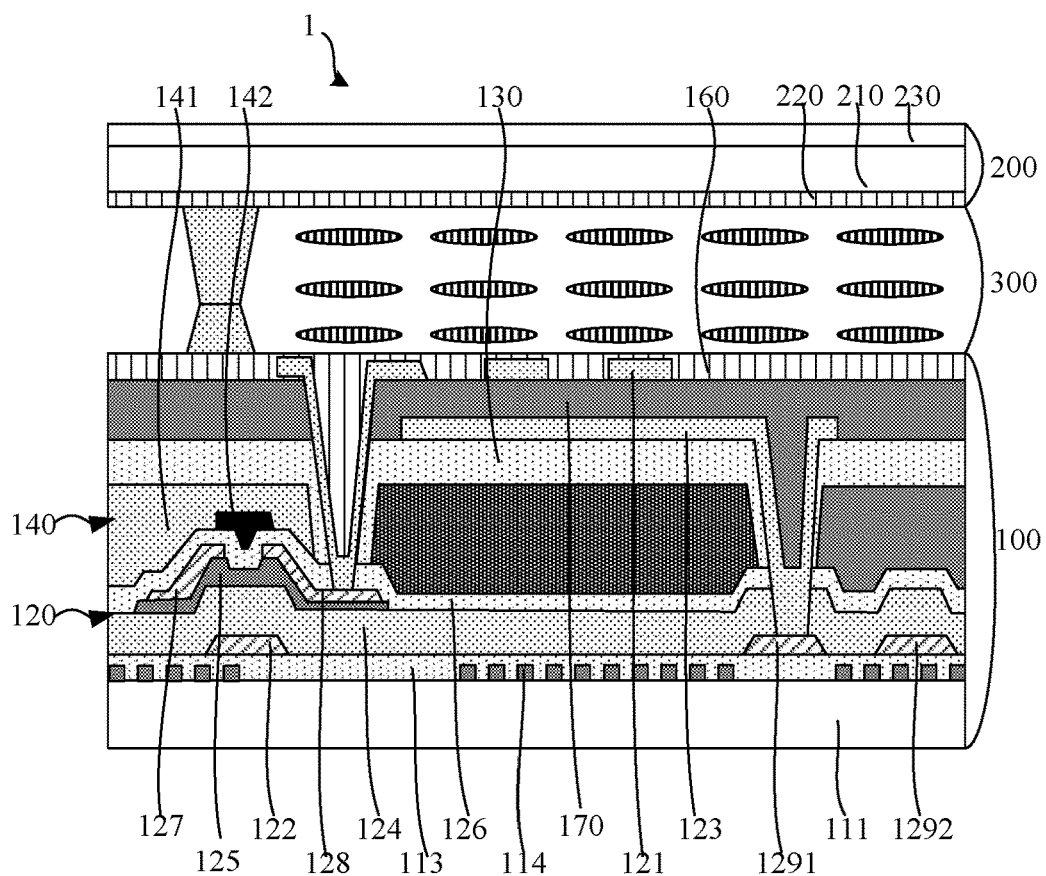
FIG. 5 is a structural diagram of another display panel according to an exemplary embodiment of the present disclosure.

FIG. 5 is a structural diagram of another display panel according to an exemplary embodiment of the present disclosure. In other exemplary embodiments, as shown in FIG. 5, the first substrate 100 may adopt a high-aperture ratio and High-Adwanced Dimens In Switch (HADS) type, that is, the array structure layer 120 may include a gate metal layer arranged on a side of the refractive layer 113 away from the light guide plate 111, a first insulating layer 124 covering the gate metal layer, an active layer 125 arranged on the first insulating layer 124, a source-drain metal layer arranged on the active layer 125, a second insulating layer 126 covering the source-drain metal layer, and a black matrix 142 arranged on the second insulating layer 126. The source-drain metal layer includes a source electrode 127 and a drain electrode 128. An end of the source electrode 127 adjacent to the drain electrode 128 is overlapped on the active layer 125, and an end of the drain electrode 128 adjacent to the source electrode 127 is overlapped on the active layer 125. A conductive channel is formed between the electrode 127 and the drain electrode 128. An orthographic projection of the black matrix 142 on the light guide plate 111 covers an orthographic projection of the conductive channel on the light guide plate 111. The gate metal layer includes a gate electrode 122, a common lead 1291, and an extraction electrode 1292. The second insulating layer 126 may also be referred to as an interlayer insulating layer. The first substrate 100 further includes a color filter structure layer 140 arranged on the second insulating layer 126 and covering the black matrix 142. The color filter structure layer 140 includes a plurality of color filter units 141, which are in one-to-one correspondence with the pixel electrodes 121. The first substrate 100 further includes a first flat layer 130 covering the color filter structure layer 140, and the array structure layer 120 further includes a common electrode 123 arranged on the first flat layer 130. The first flat layer 130 is provided with a first via hole exposing the common lead 1291, and the common electrode 123 is connected with the common lead 1291 through the first via hole. The first via hole is arranged between adjacent color filter units 141. The first substrate 100 further includes a third insulating layer 170 covering the common electrode 123, and the pixel electrode 121 is arranged on the third insulating layer 170. The third insulating layer 170 includes a second via hole exposing the drain electrode 128, the pixel electrode 121 is connected with the drain electrode 128 through the second via hole, and the second via hole is arranged between adjacent color filter units 141. The pixel electrodes 121 may be slit electrodes, the common electrodes 123 may be plate electrodes, and the pixel electrodes 121 are in one-to-one correspondence with the common electrodes 123. The first substrate 100 further includes a first alignment layer 160 arranged on the pixel electrode 121. The gate metal layer and the source-drain metal layer may be made of a metal such as aluminum, silver or copper. The first insulating layer 124, the second insulating layer 126 and the third insulating layer 170 may be made of a resin dielectric material, for example, Flexi OM™ series produced by Flex Enable company may be used. The active layer 125 may be made of an organic material, such as 3-hexylthiophene, polyfluorene-based polymer or polythiophene. In this example, arranging the color filter structure layer 140 on the array structure layer 120 may effectively prevent the color filter units 141 and the pixel electrodes 121 from being misaligned after the display panel 1 is bent, avoid light leakage after the display panel 1 is bent, and improve the display quality of the display panel 1.

In some exemplary embodiments, as shown in FIG. 1 or 5, the second substrate 200 includes a substrate 210 and a second alignment layer 220 arranged on a side of the substrate 210 facing the first substrate 100. The display panel 1 further includes a liquid crystal layer 300 arranged between the first alignment layer 160 and the second alignment layer 220. The material of the first alignment layer 160 and the second alignment layer 220 may be polyimide. In an example, the second substrate 200 further includes a polarizer 230 arranged on a side of the substrate 210 away from the second alignment layer 220.

Figure 6:
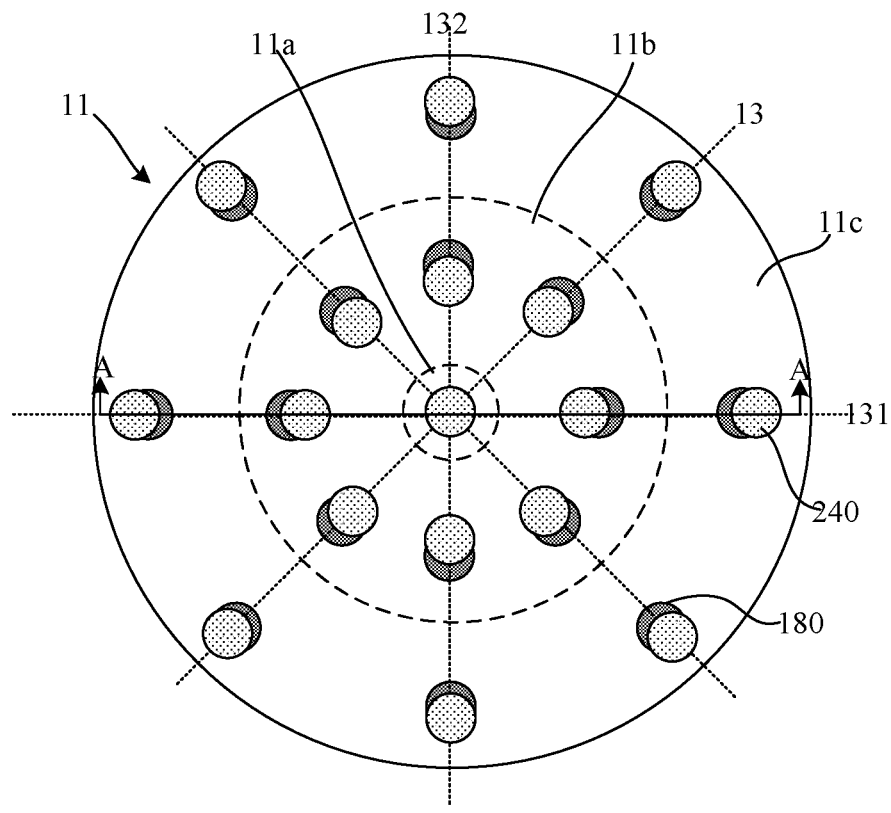
FIG. 6 is a plan view of distribution of first spacer posts and second spacer posts of a display panel according to an exemplary embodiment of the present disclosure.
Figure 7:
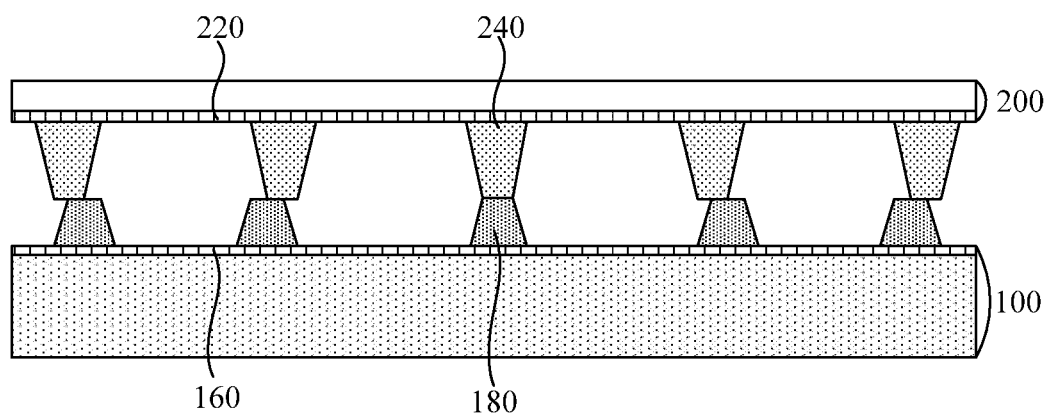
FIG. 7 is a sectional view at position A-A in FIG. 6.

FIG. 6 is a plan view of distribution of first spacer posts and second spacer posts of a display panel according to an exemplary embodiment of the present disclosure, and FIG. 7 is a sectional view at position A-A in FIG. 6. In some exemplary embodiments, as shown in FIGS. 6 and 7, the display panel 1 further includes a plurality of first spacer posts 180 arranged on a side of the first substrate 100 facing the second substrate 200, and a plurality of second spacer posts 240 arranged on a side of the second substrate 200 facing the first substrate 100. The first spacer posts 180 are in one-to-one correspondence with the second spacer posts 240. A height of the first spacer post 180 in a direction perpendicular to the first substrate 100 is smaller than that of the second spacer post 240 in a direction perpendicular to the second substrate 200. For example, the height of the first spacer post 180 in the direction perpendicular to the first substrate 100 is 1 micron to 2 microns, and the height of the second spacer post 240 in the direction perpendicular to the second substrate 200 is 3 microns to 4 microns. The first spacer post 180 includes a first support surface facing the second spacer post 240, and the second spacer post 240 includes a second support surface facing the first spacer post 180. The shapes of the first support surface and the second support surface may be any one or more of round, square and regular hexagon. As shown in FIG. 3, the spacer post 33 of the conventional organic liquid crystal display panel is arranged on the color filter substrate 31 and supported between the array substrate 32 and the color filter substrate 21. During the bending process of the organic liquid crystal display panel, the position of the spacer post 33 relative to the array substrate 32 will change due to the different stretching conditions of the color filter substrate 31 and the array substrate 32, which will scratch the first alignment layer 160, thereby affecting the alignment of liquid crystals. In this example, first spacer posts 180 are arranged on the first substrate 100, second spacer posts 240 are arranged on the second substrate 200, and the first spacer posts 180 are in one-to-one correspondence with the second spacer posts 240. In the bending process of the display panel 1, although the relative positions of the first spacer posts 180 and the second spacer posts 240 will also change due to the different stretching conditions of the first substrate 100 and the second substrate 200, because the first support surface of the first spacer posts 180 does not contact with the second alignment layer 220 and the second support surface of the second spacer posts 240 does not contact with the first alignment layer 160, the orientation layers will not be scratched even when the relative positions of the first spacer posts 180 and the second spacer posts 240 are changed.

In some exemplary embodiments, as shown in FIGS. 6 and 7, the display panel 1 includes a bending area 11 including a first alignment region 11a, and a second alignment region 11b and a third alignment region 11c which are arranged on a periphery of the first alignment region 11a and concentric with the first alignment region 11a. The first alignment region 11a includes a pair of the first spacer post 180 and the second spacer post 240, a geometric center of the first support surface of the first spacer post 180 is opposite to that of the second support surface of the second spacer post 240, and the geometric center of the first support surface of the first spacer post 180 and the geometric center of the second support surface of the second spacer post 240 are on a plane that is perpendicular to the first substrate 100 and the second substrate 200 and includes a bending axis 13 of the bending area 11. The bending axis 13 may be a center line of the display panel 1 during the bending process, and the display panel 1 on both sides of the center line may be bent with the center line as the axis. In the second alignment region 11b, in any pair of the first spacer post 180 and the second spacer post 240, a distance between the geometric center of the first support surface of the first spacer post 180 and the geometric center of the first support surface of the first spacer post 180 in the first alignment region 11a is greater than a distance between the geometric center of the second support surface of the second spacer post 240 and the geometric center of the second support surface of the second spacer post 240 in the first alignment region 11a. In the third alignment region 11c, in any pair of the first spacer post 180 and the second spacer post 240, a distance between the geometric center of the first support surface of the first spacer post 180 and the geometric center of the first spacer post 180 in the first alignment region 11a is smaller than the distance between the geometric center of the second support surface of the second spacer post 240 and the geometric center of the second support surface of the second spacer post 240 in the first alignment region 11a. For example, as shown in FIG. 6, the second alignment region 11b is arranged at a periphery of the first alignment region 11a, and the third alignment region 11c is arranged at a periphery of the second alignment region 11b. The second alignment region 11b includes pairs of the first spacer post 180 and the second spacer post 240 that surround at least one ring of the first alignment region 11a. The number of the pairs of the first spacer post 180 and the second spacer post 240 included in one ring may be 6 or 8. In any pair of the first spacer post 180 and the second spacer post 240, the distance between the geometric center of the first support surface of the first spacer post 180 and the geometric center of the first support surface of the first spacer post 180 in the first alignment region 11a is greater than a distance between the geometric center of the second support surface of the second spacer post 240 and the geometric center of the second support surface of the second spacer post 240 in the first alignment region 11a. The third alignment region 11c includes pairs of the first spacer post 180 and the second spacer post 240 that surround at least one ring of the first alignment region 11a. The number of the pairs of the first spacer post 180 and the second spacer post 240 included in one ring may be 6 or 8. In any pair of the first spacer post 180 and the second spacer post 240, the distance between the geometric center of the first support surface of the first spacer post 180 and the geometric center of the first support surface of the first spacer post 180 in the first alignment region 11a is smaller than the distance between the geometric center of the second support surface of the second spacer post 240 and the geometric center of the second support surface of the second spacer post 240 in the first alignment region 11a. The bending area 11 may include a plurality of bending axes 13 passing through the first alignment region 11a. The pairs of the first spacer posts 180 and the second spacer posts 240 in the second alignment region 11b and the third alignment region 11c are distributed on the bending axes 13, and the plurality of bending axes 13 include at least one group of a first bending axis 131 and a second bending axis 132 which are perpendicular to each other. In another example, the third alignment region 11c is arranged at a periphery of the first alignment region 11a, and the second alignment region 11b is arranged at a periphery of the third alignment region 11c, or the second alignment region 11b and the third alignment region 11c are alternately arranged along a direction away from the first alignment region 11a. An amount of the misalignment between the geometric center of the first support surface of the first spacer post 180 in the second alignment region 11b and the geometric center of the second support surface of the second spacer post 240 corresponding to the first spacer post 180 in the second alignment region 11b, and an amount of the misalignment between the geometric center of the first support surface of the first spacer post 180 in the third alignment region 11c and the geometric center of the second support surface of the second spacer post 240 corresponding to the first spacer post 180 in the third alignment region 11c are determined according to factors such as a bending radius of the bending area 11 and the stretching conditions of the first substrate 100 and the second substrate 200. The display panel 1 further includes a non-bending area. For the non-bending area, the geometric center of the first support surface of the first spacer post 180 is opposite to the geometric center of the second support surface of the second spacer post 240 corresponding to the first spacer post 180.

Figure 8:
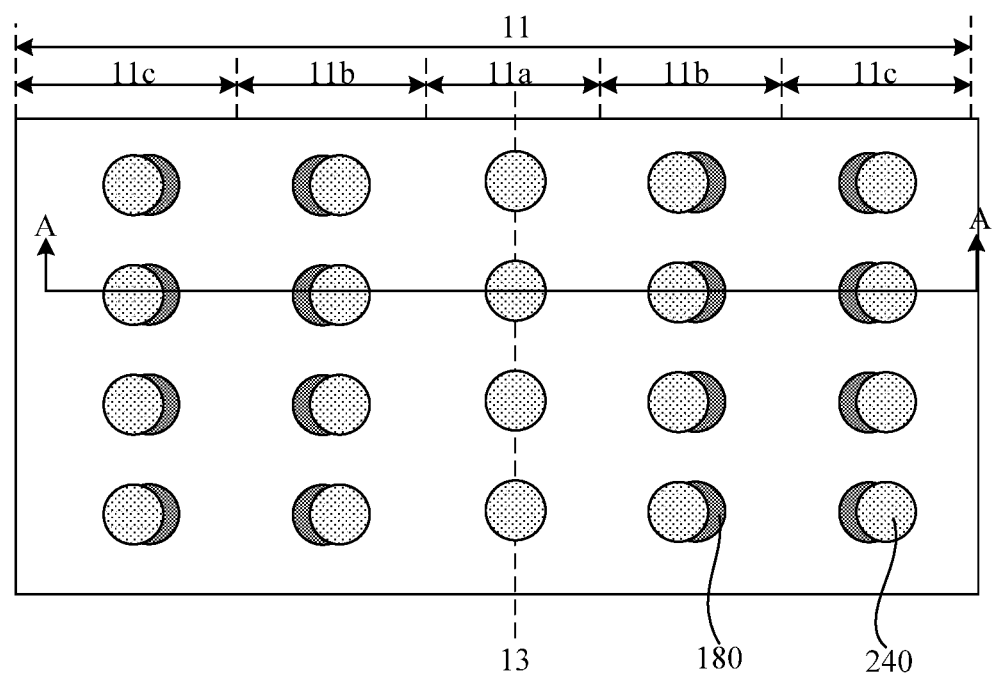
FIG. 8 is a plan view of distribution of first spacer posts and second spacer posts of a display panel according to an exemplary embodiment of the present disclosure.
Figure 9:
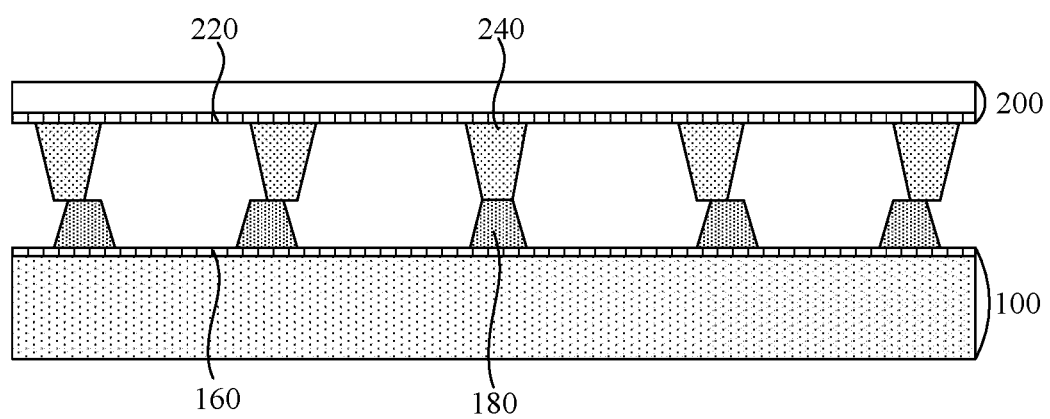
FIG. 9 is a sectional view at position A-A in FIG. 8.

FIG. 8 is a plan view of distribution of first spacer posts and second spacer posts of a display panel according to an exemplary embodiment of the present disclosure, and FIG. 9 is a sectional view at position A-A in FIG. 8. In other exemplary embodiments, as shown in FIGS. 8 and 9, the display panel 1 includes a bending area 11 including a first alignment region 11a, a second alignment region 11b, and a third alignment region 11c. The bending area 11 includes a bending axis 13 located in the first alignment region 11a. The second alignment region 11b and the third alignment region 11c are arranged at least on a side of the first alignment region 11a along a direction perpendicular to the bending axis. The direction perpendicular to the bending axis of the bending area 11 refers to the direction perpendicular to the bending axis and parallel to a plane where the first substrate 100 is located before bending. The plane where the first substrate 100 is located before bending refers to a plane where a side of the first substrate 100 facing the second substrate 200 is located before the first substrate 100 is bent. The first alignment region 11a includes a row of pairs of the first spacer posts 180 and the second spacer posts 240 arranged along the bending axis 13, and the number of pairs of the first spacer posts 180 and the second spacer posts 240 in a row is arranged according to a width of the display panel, which may be 6 pairs, 8 pairs or 12 pairs. In any pair of the first spacer post 180 and the second spacer post 240, the geometric center of the first support surface of the first spacer post 180 and the geometric center of the second support surface of the second spacer post 240 are opposite and located in a plane that is perpendicular to the first substrate 100 and the second substrate 200 and including the bending axis 13. In the direction perpendicular to the bending axis 13, in the second alignment region 11b, in any pair of the first spacer post 180 and the second spacer post 240, the distance between the geometric center of the first support surface of the first spacer post 180 and the geometric center of the first spacer post 180 in the first alignment region 11a is greater than the distance between the geometric center of the second support surface of the second spacer post 240 and the geometric center of the second support surface of the second spacer post 240 in the first alignment region 11a. In the third alignment region 11c, in the direction perpendicular to the bending axis 13, in any pair of the first spacer post 180 and the second spacer post 240, the distance between the geometric center of the first support surface of the first spacer post 180 and the geometric center of the first support surface of the first spacer post 180 in the first alignment region 11a is smaller than the distance between the geometric center of the second support surface of the second spacer post 240 and the geometric center of the second support surface of the second spacer post 240 in the first alignment region 11a. For example, as shown in FIG. 8, the third alignment regions 11c are located on both sides of the first alignment region 11a perpendicular to the bending axis 13, and the second alignment regions 11b are located between the third alignment regions 11c and the first alignment region 11a. At least one second alignment region 11b includes a row of pairs of the first spacer posts 180 and the second spacer posts 240 parallel to the bending axis 13. In any pair of the first spacer post 180 and the second spacer post 240, in the direction perpendicular to the bending axis, the distance between the geometric center of the first support surface of the first spacer post 180 and the geometric center of the first spacer post 180 in the first alignment region 11a is greater than the distance between the geometric center of the second support surface of the second spacer post 240 and the geometric center of the second support surface of the second spacer post 240 in the first alignment region 11a. At least one third alignment region 11c includes a row of pairs of the first spacer posts 180 and the second spacer posts 240 parallel to the bending axis 13. In any pair of the first spacer post 180 and the second spacer post 240, in the direction perpendicular to the bending axis, the distance between the geometric center of the first support surface of the first spacer post 180 and the geometric center of the first spacer post 180 in the first alignment region 11a is smaller than the distance between the geometric center of the second support surface of the second spacer post 240 and the geometric center of the second support surface of the second spacer post 240 in the first alignment region 11a. In another example, the second alignment regions 11b are located on both sides of the first alignment region 11a in a direction perpendicular to the bending axis 13, and the third alignment regions 11c are located between the second alignment regions 11b and the first alignment region 11a. An amount of the misalignment between the geometric center of the first support surface of the first spacer post 180 in the second alignment region 11b and the geometric center of the second support surface of the second spacer post 240 corresponding to the first spacer post 180 in the second alignment region 11b, and an amount of the misalignment between the geometric center of the first support surface of the first spacer post 180 in the third alignment region 11c and the geometric center of the second support surface of the second spacer post 240 corresponding to the first spacer post 180 in the third alignment region 11c are determined according to factors such as a bending radius of the bending area 11 and the stretching conditions of the first substrate 100 and the second substrate 200. The display panel 1 further includes a non-bending area 12. For the non-bending area 12, the geometric center of the first support surface of the first spacer post 180 is opposite to the geometric center of the second support surface of the second spacer post 240 corresponding to the first spacer post 180.

Figure 10:
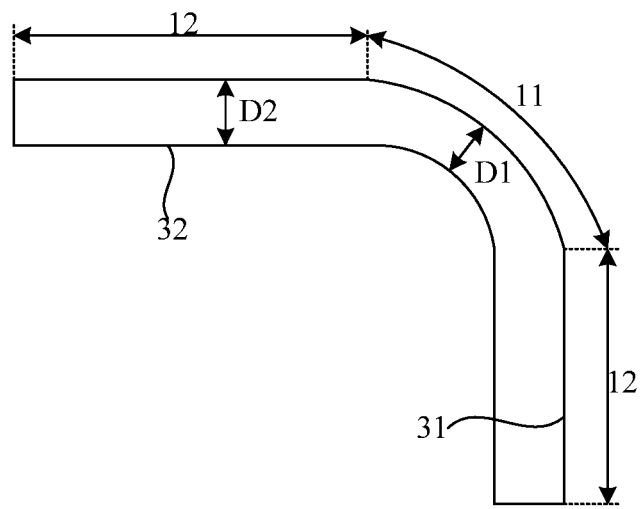
FIG. 10 is a schematic diagram of the thickness change of a liquid crystal cell after an organic liquid crystal display panel is bent.
Figure 11A:
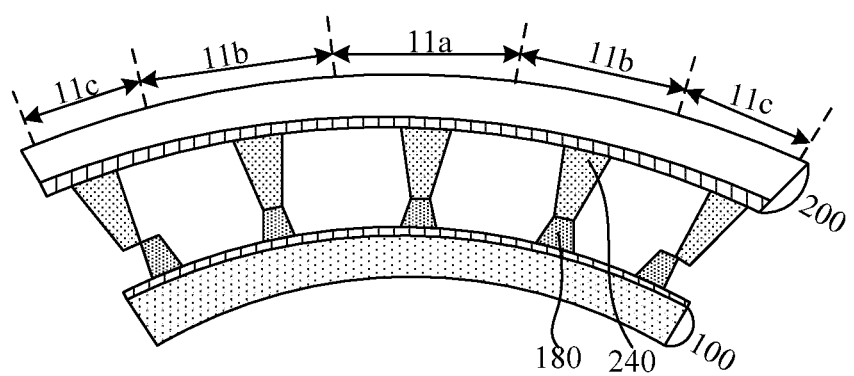
FIG. 11A is a schematic structural diagram of a positively bent display panel according to an exemplary embodiment of the present disclosure.
Figure 11B:
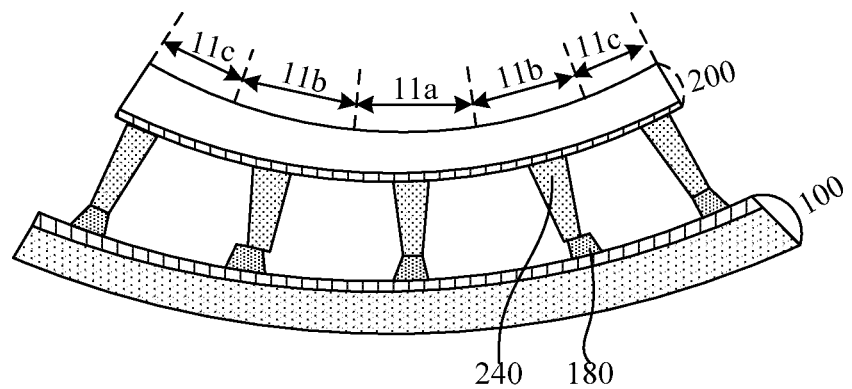
FIG. 11B is a schematic structural diagram of a negatively bent display panel according to an exemplary embodiment of the present disclosure.

FIG. 10 is a schematic diagram of the thickness change of a liquid crystal cell after an organic liquid crystal display panel is bent, FIG. 11A is a schematic structural diagram of a positively bent display panel according to an exemplary embodiment of the present disclosure, and FIG. 11B is a schematic structural diagram of a negatively bent display panel according to an exemplary embodiment of the present disclosure; As shown in FIG. 10, for a conventional organic liquid crystal display panel, due to the different stretching conditions of the color filter substrate 31 and the array substrate 32 after the bending area 11 is bent, a thickness D1 of the liquid crystal cell in the bending area 11 is smaller than a thickness D2 of the liquid crystal cell in the non-bending area 12, which leads to the difference in brightness and other characteristics of the display screen between the bending area 11 and the non-bending area 12. The thickness of the liquid crystal cell refers to the space between the color filter substrate 31 and the array substrate 32. In the above embodiment, as shown in FIGS. 11A and 11B, the display panel 1 is always supported between the first substrate 100 and the second substrate 200 before and after bending by opposing the geometric center of the first support surface of the first spacer post 180 to the geometric center of the second support surface of the second spacer post 240 corresponding to the first spacer post 180 in the first alignment region 11a. The geometric center of the first support surface of the first spacer post 180 is misaligned with the second support surface of the second spacer post 240 corresponding to the first spacer post 180 in the second alignment region 11b, and the geometric center of the first support surface of the first spacer post 180 is misaligned with the geometric center of the second support surface of the second spacer post 240 corresponding to the first spacer post 180 in the third alignment region 11c, and is opposite to the misalignment direction in the second alignment region 11b. As shown in FIG. 11A, after the display panel 1 is bent along the bending axis to form a positive bend, the geometric centers of the pair of the first spacer post 180 and the second spacer post 240 in the second alignment region 11b are opposite to each other. As shown in FIG. 11B, after the display panel 1 is bent along the bending axis to form a negative bend, the geometric centers of the pair of the first spacer post 180 and the second spacer post 240 in the third alignment region 11c are opposite to each other. That is to say, whether the display panel 1 is bent positively (as shown in 11A) or negatively (as shown in 11B), it may be ensured that the geometric centers of at least part of the pairs of the first spacer posts 180 and the second spacer posts 240 in one of the second alignment region 11b and the third alignment region 11c are opposite to each other and supported between the first substrate 100 and the second substrate 200, thereby preventing the thickness of the liquid crystal cell from narrowing, and further ensuring that the display effects of the bending area 11 and the non-bending area 12 of the display panel 1 are consistent.

A structure of the display panel 1 according to the present disclosure is described below by an example of a preparation process of the display panel 1. The "patterning process" mentioned in the present disclosure includes processes, such as film layer deposition, photoresist coating, mask exposure, development, etching, and photoresist stripping. The deposition may be selected as any one or more of sputtering, evaporation and chemical vapor deposition, the coating may be selected as any one or more of spraying and spin coating, and etching may be selected as any one or more of dry etching and wet etching. A "thin film" refers to a layer of thin film manufactured from a certain material on a base substrate by using deposition or coating process. If the "thin film" does not need a patterning process during the whole manufacturing process, the "thin film" may also be called a "layer". When the "thin film" needs a patterning process during the whole manufacturing process, it is called "thin film" before the patterning process and called "layer" after the patterning process. The "layer" after the patterning process contains at least one "pattern". In the present disclosure, "a and b are arranged on the same layer" means that a and b are formed at the same time by the same patterning process. "An orthographic projection of A includes an orthographic projection of B" means that the orthographic projection of B falls within a range of the orthographic projection of A, or the orthographic projection of A covers the orthographic projection of B.

In some exemplary embodiments, the preparation process of the display panel 1 may include preparation of a first substrate 100, preparation of a second substrate 200, and process of aligning and combining into a cell. The preparation processes of the first substrate 100 and the second substrate 200 are in no particular order, that is, they may be performed simultaneously, or the first substrate 100 may be prepared before the second substrate 200, or the second substrate 200 may be prepared before the first substrate 100, which is not limited in this example.

I. Preparation Process of the First Substrate 100

(1) Coating a light guide film on a glass carrier plate and curing into a film to form a light guide plate 111.

In some exemplary embodiments, a refractive index of the light guide plate 111 is 1.4 to 1.7, a thickness of the light guide plate 111 is 100 microns to 150 microns, and a material of the light guide plate 111 may be cellulose triacetate (TAC), polyimide (PI) or polymethylmethacrylate (PMMA).

(2) Depositing a grating film on the light guide plate 111, and patterning the grating film by a patterning process to form a pattern of a grating layer 112.

Figure 12:
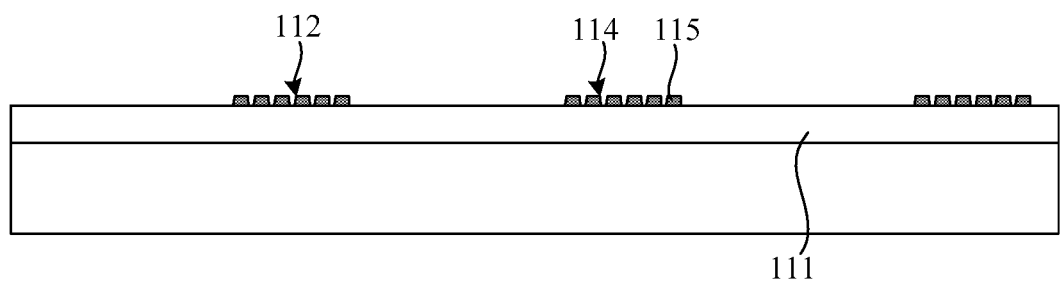
FIG. 12 is a schematic structural diagram according to an exemplary embodiment of the present disclosure after a grating layer is formed.

In some exemplary embodiments, as shown in FIG. 12, the pattern of the grating layer 112 is formed in a pixel light-emitting area, and the pattern of the grating layer 112 includes a plurality of grating units 114 arranged in an array, and including a plurality of grid lines 115 arranged in parallel. In some exemplary embodiments, a period of the grating unit 114 may be 150 nm to 600 nm, for example, 380 nm, a height H1 of the gate line 115 may be 200 nm to 400 nm, for example, 350 nm, and a line width L1 of the gate line 115 may be 200 nm to 300 nm, for example, 228 nm. The grating unit 114 may be made of aluminum (AL), silver (Ag), copper (Cu), or silicon nitride (Si3N4), and a diffraction efficiency of the grating unit 114 is 20% to 30%. FIG. 12 is a schematic structural diagram according to an exemplary embodiment of the present disclosure after a grating layer is formed.

(3) Coating a refractive layer film on the substrate with the aforementioned pattern formed thereon, and curing into a film to form a refractive layer 113.

Figure 13:
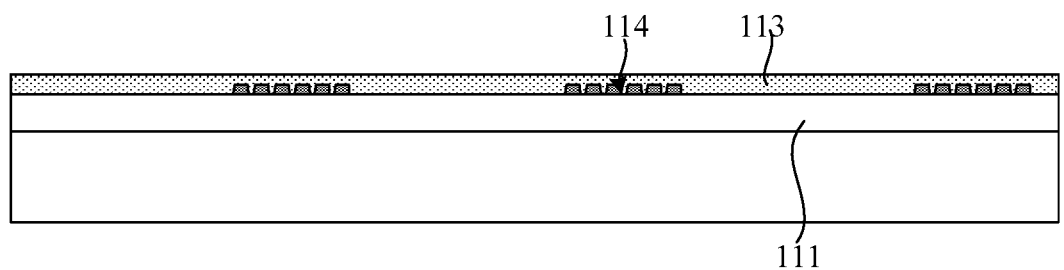
FIG. 13 is a schematic structural diagram according to an exemplary embodiment of the present disclosure after a refractive layer is formed.

In some exemplary embodiments, the refractive layer 113 formed is as shown in FIG. 13. A refractive index of the refractive layer 113 is smaller than that of the light guide plate 111. A material of the refractive layer 113 may be a resin material doped with silicon oxide (SiOX). The refractive layer 114 has a thickness of 500 nm to 900 nm, for example, 800 nm. The refractive index of the refractive layer 113 may be 1.1 to 1.3. FIG. 13 is a schematic structural diagram according to an exemplary embodiment of the present disclosure after a refractive layer is formed.

Through the preparation process of actions (1) to (3), a backlight structure layer 110 is formed. After the backlight structure layer 110 is formed, an array structure layer 120 and a color filter structure layer 140 may be sequentially formed. In some exemplary embodiments, the action of forming the array structure layer 120 includes:

(4) Depositing a first transparent conductive film on the substrate with the aforementioned pattern formed thereon, and patterning the transparent conductive film by a patterning process to form a pattern of a common electrode 123.

Figure 14:
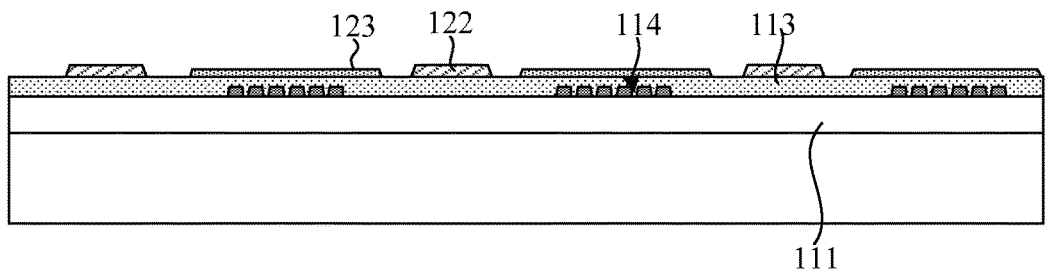
FIG. 14 is a schematic structural diagram according to an exemplary embodiment of the present disclosure after a gate metal layer is formed.

In some exemplary embodiments, as shown in FIG. 14, the pattern of the common electrode 123 is formed in the pixel light-emitting area. The pattern of the common electrode 123 includes a plurality of common electrodes 123 arranged in an array, the common electrodes 123 are in one-to-one correspondence with the grating units 114, and the orthographic projection of the common electrodes 123 on the light guide plate 111 covers the orthographic projection of the grating units 114 on the light guide plate 111. The common electrode 123 is a plate-like electrode, and the common electrode 123 may be made of indium-doped tin oxide (ITO) or aluminum-doped zinc oxide (AZO).

(5) Depositing a first metal film on the substrate with the aforementioned pattern formed thereon, and patterning the first metal film by a patterning process to form a pattern of a gate metal layer.

In some exemplary embodiments, as shown in FIG. 14, the pattern of the gate metal layer includes a gate electrode 122 arranged between the common electrodes 123. In an exemplary embodiment, the gate metal layer may be made of aluminum (AL), silver (Ag) or copper (Cu). FIG. 14 is a schematic structural diagram according to an exemplary embodiment of the present disclosure after a gate metal layer is formed.

(6) Coating a first insulating film on the substrate with the aforementioned pattern formed thereon, depositing an active layer film on the first insulating film after curing, patterning the active layer film by a patterning process, such that the first insulating film forms a pattern of a first insulating layer 124, and the active layer film forms a pattern of an active layer 125.

Figure 15:
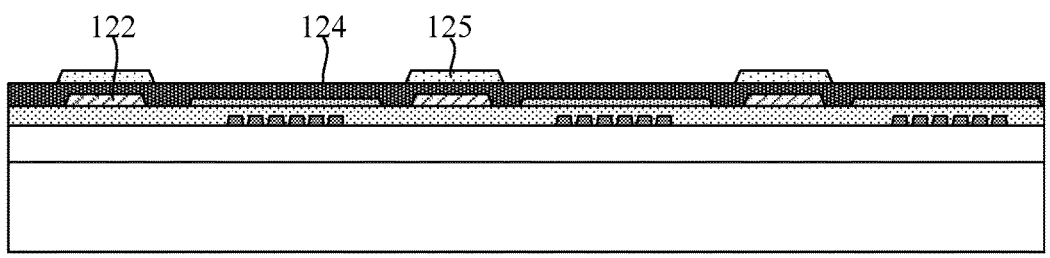
FIG. 15 is a schematic structural diagram according to an exemplary embodiment of the present disclosure after an active layer is formed.

In some exemplary embodiments, as shown in FIG. 15, the active layers 125 are in one-to-one correspondence with the gate electrode 122, and the orthographic projection of the active layers 125 on the light guide plate 111 covers the orthographic projection of the gate electrodes 122 on the light guide plate 111. The active layer 125 may be made of an organic material, such as 3-hexylthiophene, polyfluorene-based polymer, and polythiophene. FIG. 15 is a schematic structural diagram according to an exemplary embodiment of the present disclosure after an active layer is formed.

(7) Depositing a second metal film on the substrate with the aforementioned pattern formed thereon, patterning the second metal film by a patterning process to form a source-drain metal pattern.

Figure 16:
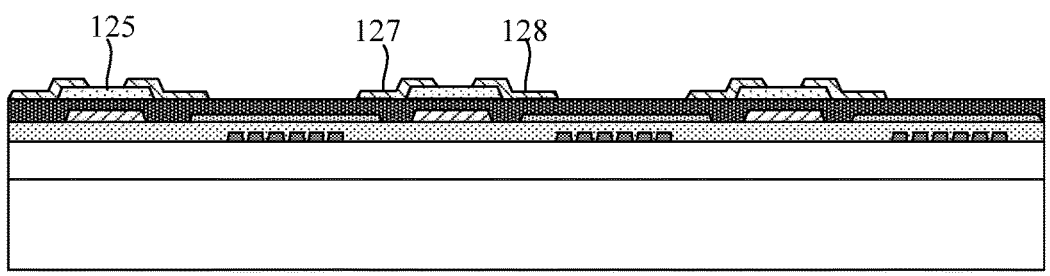
FIG. 16 is a schematic structural diagram according to an exemplary embodiment of the present disclosure after a source-drain metal layer is formed.

In some exemplary embodiments, as shown in FIG. 16, the source-drain metal pattern includes a source electrode 127 and a drain electrode 128. An end of the source electrode 127 adjacent to the drain electrode 128 is overlapped on the active layer 125, an end of the drain electrode 128 adjacent to the source electrode 127 is overlapped on the active layer 125. In some exemplary embodiments, the source-drain metal layer may be made of aluminum, silver or copper. FIG. 16 is a schematic structural diagram according to an exemplary embodiment of the present disclosure after a source-drain metal layer is formed.

(8) Coating a second insulating film on the substrate with the aforementioned pattern formed thereon, and forming a pattern of a via holes k1 after masking, exposing and developing, wherein the second insulating film forms a second insulating layer 126.

Figure 17:
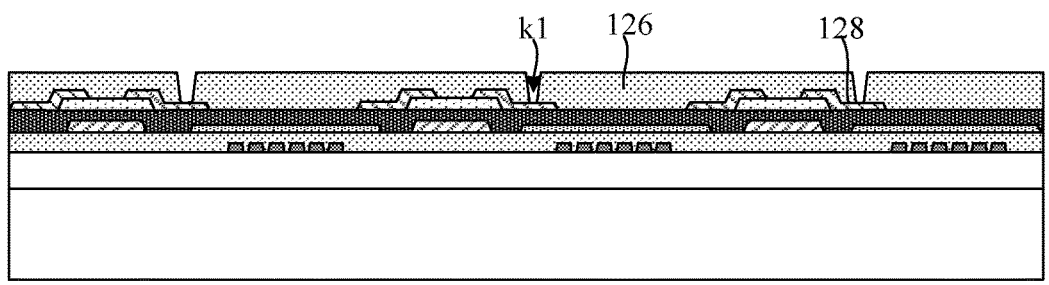
FIG. 17 is a schematic structural diagram according to an exemplary embodiment of the present disclosure after a via hole is formed.

In some exemplary embodiments, as shown in FIG. 17, the drain electrode 128 is exposed through the via hole k1, and the second insulating film in the via hole k1 is etched away. The second insulating film forms the second insulating layer 126. FIG. 17 is a schematic structural diagram according to an exemplary embodiment of the present disclosure after a via hole is formed.

(9) Depositing a second transparent conductive film on the substrate with the aforementioned pattern formed thereon, and patterning the second transparent conductive film by a patterning process to form a pattern of a pixel electrode 121.

Figure 18:
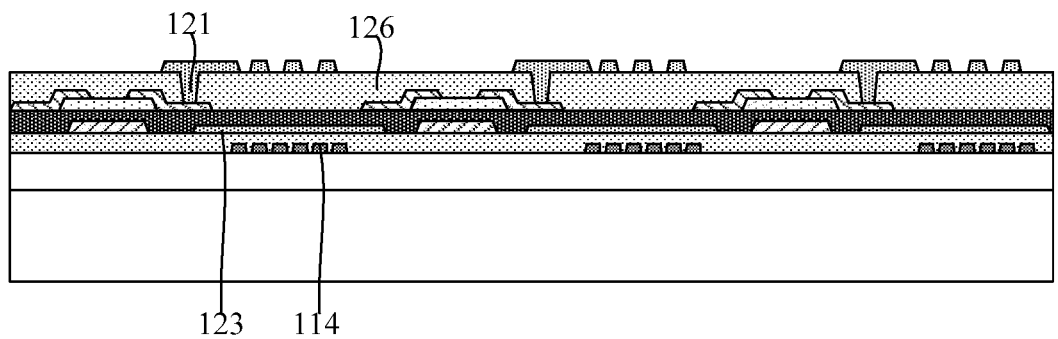
FIG. 18 is a schematic structural diagram according to an exemplary embodiment of the present disclosure after pixel electrodes are formed.

In some exemplary embodiments, as shown in FIG. 18, the pattern of the pixel electrode 121 is formed in the pixel light-emitting area, and the pattern of the pixel electrode 121 includes a plurality of pixel electrodes 121 arranged in an array, the pixel electrodes are in one-to-one correspondence with the common electrodes 123, and the pixel electrodes 121 are in one-to-one correspondence with the grating units 114. The orthographic projection of the pixel electrodes 121 on the light guide plate 111 includes the orthographic projection of the grating units 114 on the light guide plate 111. The pixel electrode 121 is a slit electrode. The pixel electrode 121 may be made of indium-doped tin oxide (ITO) or aluminum-doped zinc oxide (AZO). FIG. 18 is a schematic structural diagram according to an exemplary embodiment of the present disclosure after pixel electrodes are formed.

Through the preparation process of actions (4)-(9), the preparation of the array structure layer 120 is completed.

(10) Coating a first flat film on the substrate with the aforementioned pattern formed thereon, and curing into a film to form a first flat layer 130.

Figure 19:
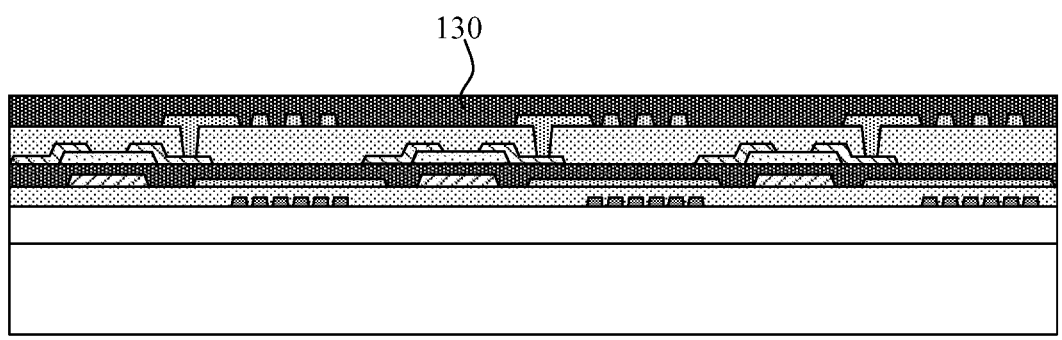
FIG. 19 is a schematic structural diagram according to an exemplary embodiment of the present disclosure after a first flat layer is formed.

In some exemplary embodiments, the first flat layer 130 formed is as shown in FIG. 19. A material of the first flat layer 130 may be polyimide or polymethylmethacrylate. FIG. 19 is a schematic structural diagram according to an exemplary embodiment of the present disclosure after a first flat layer is formed.

(11) Coating a black matrix film on the substrate with the aforementioned pattern formed thereon, and forming a pattern of a black matrix 142 after masking, exposing and developing.

Figure 20:
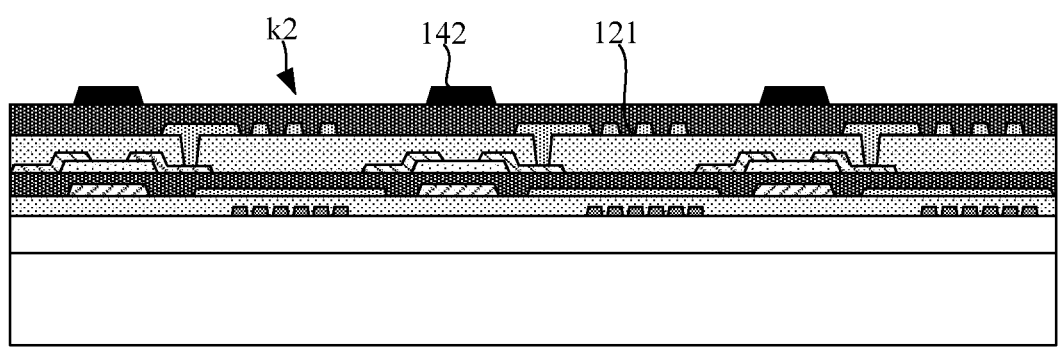
FIG. 20 is a schematic structural diagram according to an exemplary embodiment of the present disclosure after a black matrix is formed.

In some exemplary embodiments, as shown in FIG. 20, the black matrix 142 defines pixel openings k2 arranged in an array, and the pixel openings k2 are in one-to-one correspondence with the pixel electrodes 121. FIG. 20 is a schematic structural diagram according to an exemplary embodiment of the present disclosure after a black matrix is formed.

Figure 21:
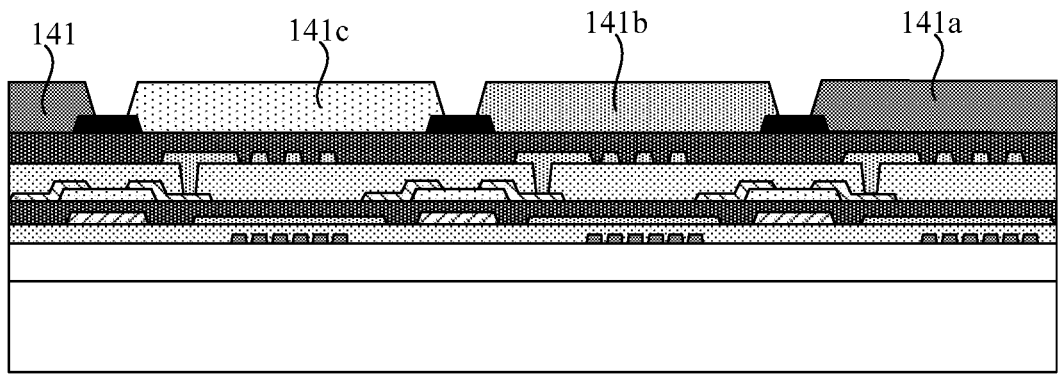
FIG. 21 is a schematic structural diagram according to an exemplary embodiment of the present disclosure after color filter units are formed.

(12) Coating a color resist film on the substrate with the aforementioned pattern formed thereon, and forming a pattern of a color filter unit 141 after masking, exposing and developing, as shown in FIG. 21.

In some exemplary embodiments, as shown in FIG. 21, the pattern of the color filter unit 141 includes a plurality of color filter units 141 arranged in an array, and the filter units 141 cover the pixel openings, and include red color filter units 141a, blue color filter units 141b and green color filter units 141c. FIG. 21 is a schematic structural diagram according to an exemplary embodiment of the present disclosure after color filter units are formed.

Through the preparation process of actions (11) and (12), the preparation of the color filter structure layer 140 is completed.

(13) Coating a second flat film on the substrate with the aforementioned pattern formed thereon, and forming a second flat layer 150.

Figure 22:
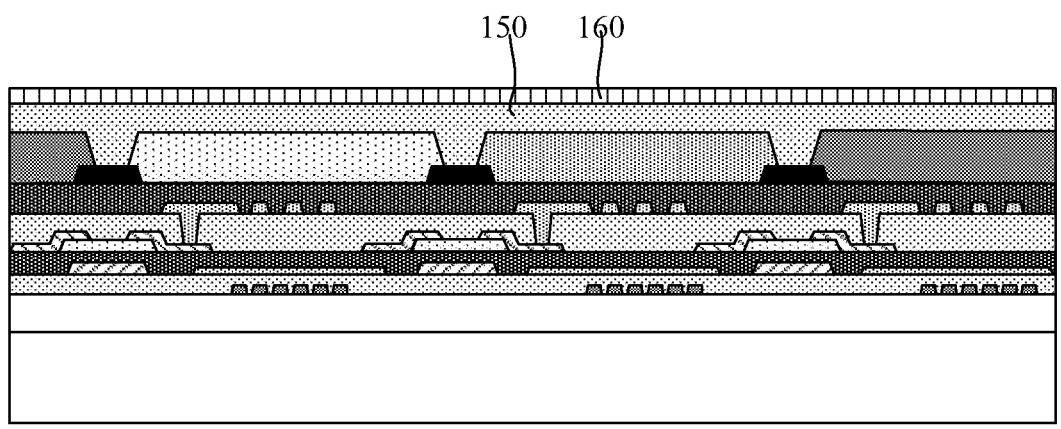
FIG. 22 is a schematic structural diagram according to an exemplary embodiment of the present disclosure after a second flat layer is formed.

In some exemplary embodiments, the second flat layer 150 formed is as shown in FIG. 22. The material of the second flat layer 150 may be polyimide or polymethylmethacrylate.

(14) Coating a first alignment film on the substrate with the aforementioned pattern formed thereon, and forming a first alignment layer 160.

In some exemplary embodiments, the first alignment layer 160 formed is as shown in FIG. 22. The material of the first alignment layer 160 may include polyimide. FIG. 22 is a schematic structural diagram according to an exemplary embodiment of the present disclosure after a second flat layer is formed.

(15) Coating a first spacer film on the substrate with the aforementioned pattern formed thereon, and forming a pattern of a first spacer post 180 after masking, exposing and developing.

Figure 23:
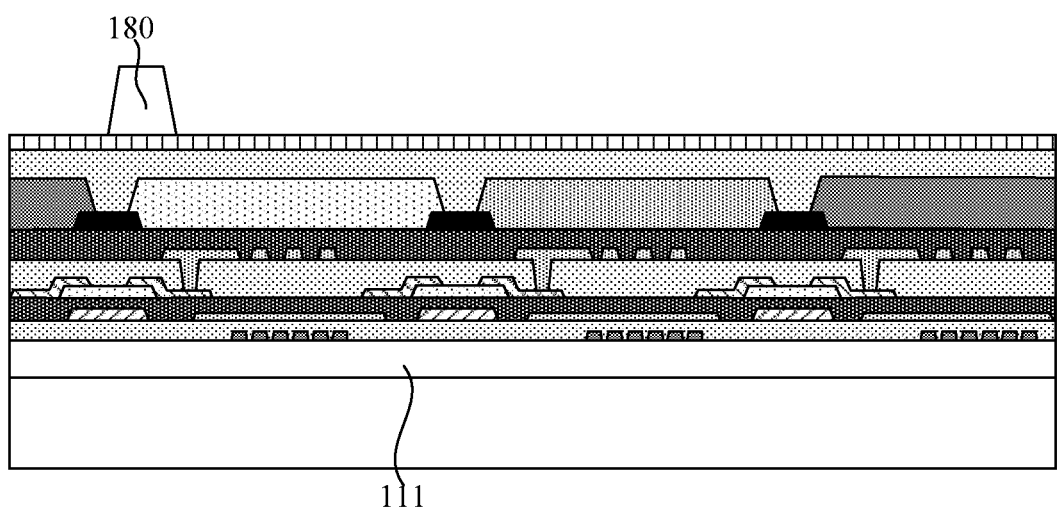
FIG. 23 is a schematic structural diagram according to an exemplary embodiment of the present disclosure after first spacer posts are formed.

In some exemplary embodiments, as shown in FIG. 23, the pattern of the first spacer post 180 includes a plurality of first spacer posts 180 arranged at intervals. In a direction perpendicular to the light guide plate 111, a height of the first spacer post 180 is 1 micron to 2 microns. FIG. 23 is a schematic structural diagram according to an exemplary embodiment of the present disclosure after first spacer posts are formed.

II. Preparation of the Second Substrate 200

(1) Coating a substrate film on a glass carrier plate, and curing into a film to form a substrate 210.

Figure 24:
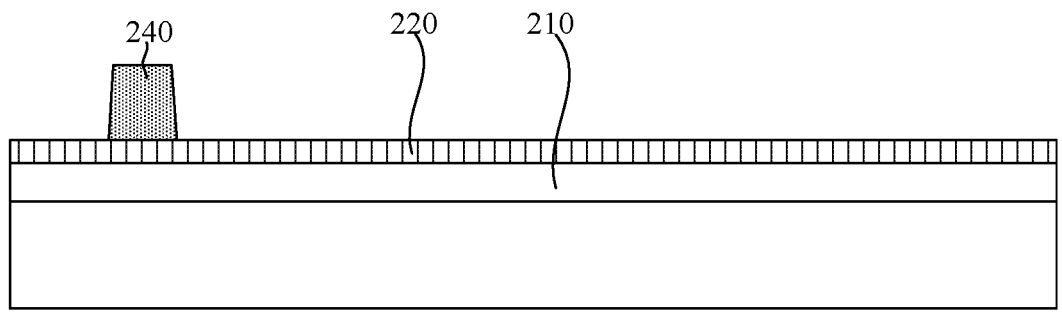
FIG. 24 is a schematic structural diagram according to an exemplary embodiment of the present disclosure after second spacer posts are formed.

In some exemplary embodiments, substrate 210 formed is as shown in FIG. 24. A material of the substrate 210 may be cellulose triacetate (TAC), polyimide (PI) and polymethylmethacrylate (PMMA).

(2) Coating a second alignment film on the substrate, and curing into a film to form a second alignment layer 220.

In some exemplary embodiments, the second alignment layer 220 formed is as shown in FIG. 24. The material of the second alignment layer 220 may include polyimide.

(3) Coating a second spacer film on the substrate with the aforementioned pattern formed thereon, and forming a pattern of a second spacer post 240 after masking, exposing and developing.

In some exemplary embodiments, as shown in FIG. 24, the pattern of the second spacer post 240 includes a plurality of second spacer posts 240 arranged at intervals. In a direction perpendicular to the substrate 210, a height of the second spacer post 240 is 3 microns to 4 microns. FIG. 24 is a schematic structural diagram according to an exemplary embodiment of the present disclosure after second spacer posts are formed.

Figure 25:
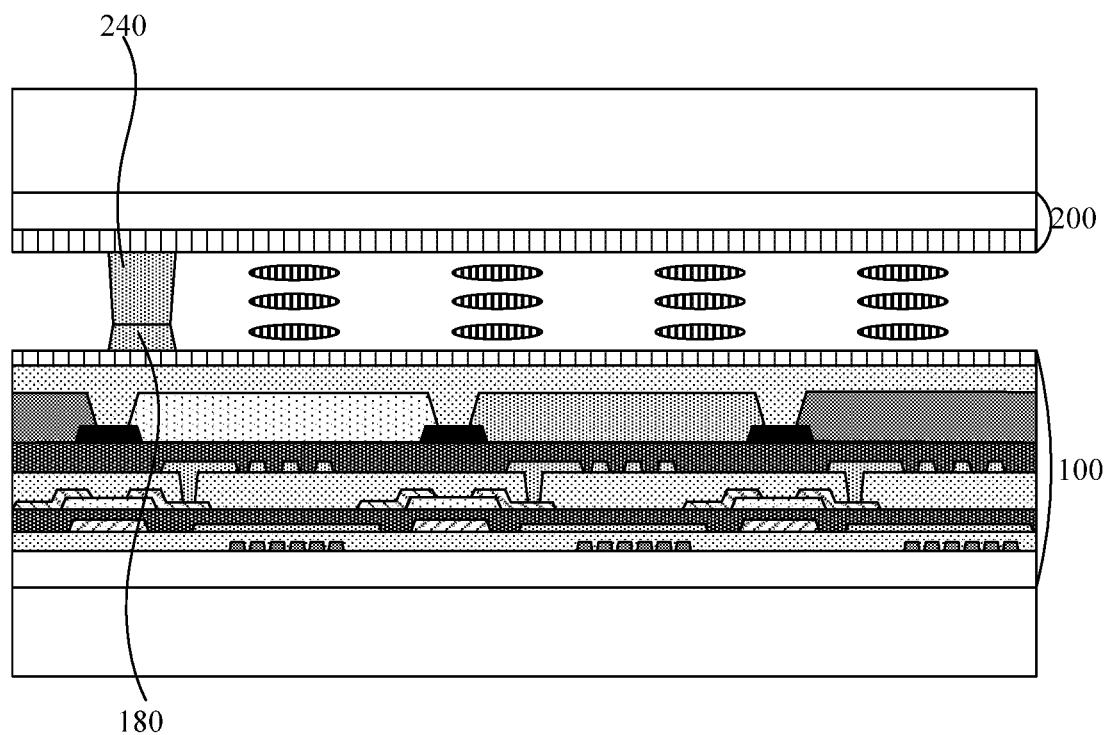
FIG. 25 is a schematic diagram according to an exemplary embodiment of the present disclosure after a first substrate and a second substrate are aligned and combined.

III. Aligning and Combining the First Substrate 100 and the Second Substrate 200 into a Cell Liquid crystal is drop-coated on the display area of the first substrate 100, and a sealant on the non-display area of the second substrate 200; the first substrate 100 and the second substrate 200 are aligned, and the first spacer posts 180 are in one-to-one correspondence with the second spacer posts 240; and they are pressed and the sealant is cured under a vacuum condition to form a structure shown in FIG. 25. After removing the glass carrier plate by pyrolysis, a display panel 1 as shown in FIG. 1 is formed.

In some exemplary embodiments, the prepared display panel 1 includes a first substrate 100 and a second substrate 200 which are aligned and combined into a cell. The first substrate 100 is provided with a plurality of first spacer posts 180 toward the second substrate 200, and the second substrate 200 is provided with a plurality of second spacer posts 240 toward the first substrate 100. The first spacer posts 180 are in one-to-one correspondence with the second spacer posts 240, and a liquid crystal layer 300 is provided between the first substrate 100 and the second substrate 200.

The first substrate 100 includes a backlight structure layer 110, an array structure layer 120 arranged on a side of the backlight structure layer 110 facing the second substrate 200, a first flat layer 130 arranged on the array structure layer 120, a color filter structure layer 140 arranged on a side of the first flat layer 130 away from the array structure layer 120, a second flat layer 150 arranged on a side of the color filter structure layer 140 away from the first flat layer 130, and a first alignment layer 160 arranged on a side of the second flat layer 150 away from the color filter structure layer 140.

The backlight structure layer 110 includes:
a light guide plate 111;
a grating layer 112 arranged on the light guide plate 111, the grating layer 112 including a plurality of grating units 114; and
a refractive layer 113 covering the grating layer 112.

The array structure layer 120 includes:
a plurality of gate electrodes 122 and a plurality of common electrodes 123 arranged on a side of the refractive layer 113 away from the light guide plate 111, wherein the common electrodes 123 are in one-to-one correspondence with the grating units 114, and an orthographic projection of the common electrodes 123 on the light guide plate 111 includes an orthographic projection of the grating units 114 on the light guide plate 111;
a first insulating layer 124 covering the plurality of gate electrodes 122 and the plurality of common electrodes 123;
an active layer 125 arranged on a side of the first insulating layer 124 away from the light guide plate 111;
a source-drain metal layer arranged on the active layer 125, the source-drain metal layer including a source electrode 127 and a drain electrode 128;
a second insulating layer 126 covering the source-drain metal layer, the second insulating layer 126 including a via hole exposing the drain electrode 128; and
a plurality of pixel electrodes 121 arranged on a side of the second insulating layer 126 away from the source-drain metal layer, wherein the pixel electrodes 121 are connected with the drain electrodes 128 through via holes, the pixel electrodes 121 are in one-to-one correspondence with the grating units 114, and an orthographic projection of the pixel electrodes 121 on the light guide plate 111 includes an orthographic projection of the grating units 114 on the light guide plate 111.

The color filter structure layer 140 includes:
a black matrix 142 arranged on the first flat layer 130, the black matrix 142 defining a plurality of pixel openings; and
a plurality of color filter units 141 covering the pixel openings, and the color filter units 141 are in one-to-one correspondence with the pixel electrodes 121.

The second substrate 200 includes:
a substrate 210; and
a second alignment layer 220 arranged on a side of the substrate 210 facing the first substrate 100.

In some exemplary embodiments, the display panel 1 includes a bending area 11 and a non-bending area 12 arranged on at least one side of the bending area 11. During the bending process of the bending area 11, at least part of the first spacer posts 180 and the corresponding second spacer posts 240 in the bending area 11 have relative displacement.

In some exemplary embodiments, the bending area 11 includes a first alignment region 11a, a second alignment region 11b, and a third alignment region 11c.

In an example, as shown in FIGS. 6 and 7, the second alignment region 11b and the third alignment region 11c are arranged on a periphery of the first alignment region 11a and concentrically arranged with the first alignment region 11a. The first alignment region 11a includes a pair of the first spacer post 180 and the second spacer post 240, a geometric center of the first support surface of the first spacer post 180 is opposite to that of the second support surface of the second spacer post 240, and the geometric center of the first support surface of the first spacer post 180 and the geometric center of the second support surface of the second spacer post 240 are on a plane that is perpendicular to the first substrate 100 and the second substrate 200 and includes a bending axis 13 of the bending area 11. In the second alignment region 11b, in any pair of the first spacer post 180 and the second spacer post 240, a distance between the geometric center of the first support surface of the first spacer post 180 and the geometric center of the first support surface of the first spacer post 180 in the first alignment region 11a is greater than a distance between the geometric center of the second support surface of the second spacer post 240 and the geometric center of the second support surface of the second spacer post 240 in the first alignment region 11a. In the third alignment region 11c, in any pair of the first spacer post 180 and the second spacer post 240, a distance between the geometric center of the first support surface of the first spacer post 180 and the geometric center of the first support surface of the first spacer post 180 in the first alignment region 11a is smaller than the distance between the geometric center of the second support surface of the second spacer post 240 and the geometric center of the second support surface of the second spacer post 240 in the first alignment region 11a.

In another example, as shown in FIGS. 8 and 9, the bending area 11 includes a bending axis, which is located in the first alignment region 11a, and the second alignment region 11b and the third alignment region 11c are arranged at least on one side of the first alignment region 11a along a direction perpendicular to the bending axis. The first alignment region 11a includes a row of pairs of the first spacer posts 180 and the second spacer posts 240 arranged along a direction of the bending axis 13. In any pair of the first spacer post 180 and the second spacer post 240, the geometric center of the first support surface of the first spacer post 180 and the geometric center of the second support surface of the second spacer post 240 are opposite and located in a plane that is perpendicular to the first substrate 100 and the second substrate 200 and includes the bending axis 13. In the direction perpendicular to the bending axis, in the second alignment region 11b, in any pair of the first spacer post 180 and the second spacer post 240, the distance between the geometric center of the first support surface of the first spacer post 180 and the geometric center of the first support surface of the first spacer post 180 in the first alignment region 11a is greater than the distance between the geometric center of the second support surface of the second spacer post 240 and the geometric center of the second support surface of the second spacer post 240 in the first alignment region 11a. In the third alignment region 11c, in the direction perpendicular to the bending axis 13, in any pair of the first spacer post 180 and the second spacer post 240, the distance between the geometric center of the first support surface of the first spacer post 180 and the geometric center of the first support surface of the first spacer post 180 in the first alignment region 11a is smaller than the distance between the geometric center of the second support surface of the second spacer post 240 and the geometric center of the second support surface of the second spacer post 240 in the first alignment region 11a.

In some exemplary embodiments, the preparation process of the display panel 1 further includes attaching a polarizer 230 on a side of the substrate 210 away from the second alignment layer 220.

According to the preparation method of the exemplary display panel 1 of the present disclosure, it can be seen that:

the grating units 114 are in one-to-one correspondence with the pixel electrodes 121. When the light of the backlight 2 is totally reflected in the light guide plate 111 and extracted at the position of the grating units 114, to form collimated polarized light that may illuminate the area of the pixel electrode 121. Compared with the conventional organic liquid crystal display panel, the backlight structure layer 110 does not need to be provided with a polarizer and a phase difference plate, thus reducing the thickness of the display panel 1 and improving the flexibility of the display panel 1.

By providing the first substrate 100 with the first spacer posts 180 and the second substrate 200 with the second spacer posts 240 and arranging the first spacer posts 180 in one-to-one correspondence with the second spacer posts 240, although the bending process of the bending area 11 of the display panel 1 may cause the first spacer posts 180 and the second spacer posts 240 to move relatively, the alignment layer will not be scratched because the first support surfaces of the first spacer posts 180 do not contact the second alignment layer 220 and the second support surfaces of the second spacer posts 240 do not contact the first alignment layer 160.

In addition, the display panel 1 is always supported between the first substrate 100 and the second substrate 200 before and after bending by opposing the geometric center of the first support surface of the first spacer post 180 to the geometric center of the second support surface of the second spacer post 240 corresponding to the first spacer post 180 in the first alignment region 11a. The geometric center of the first support surface of the first spacer post 180 is misaligned with the second support surface of the second spacer post 240 corresponding to the first spacer post 180 in the second alignment region 11b, and the geometric center of the first support surface of the first spacer post 180 is misaligned with the geometric center of the second support surface of the second spacer post 240 corresponding to the first spacer post 180 in the third alignment region 11c, and is opposite to the misalignment direction in the second alignment region 11b. After the display panel 1 is bent along the bending axis, whether it is bent positively or negatively, it may be ensured that at least part of the first spacer posts 180 and the corresponding second spacer posts 240 in one of the second alignment region 11b and the third alignment region 11c are opposite in geometric center and supported between the first substrate 100 and the second substrate 200, thereby preventing the thickness of the liquid crystal cell from narrowing, and further ensuring that the display effects of the bending area 11 and the non-bending area 12 of the display panel 1 are consistent.

An embodiment of the present disclosure further provides a preparation method of a display panel, including:

forming a first substrate including a backlight structure layer and an array structure layer arranged on the backlight structure layer, wherein the backlight structure layer includes a light guide plate, a grating layer arranged on a side of the light guide plate facing the array structure layer and a refractive layer covering the grating layer, the grating layer includes a plurality of grating units, the array structure layer includes a plurality of pixel electrodes, and the grating units are in one-to-one correspondence with the pixel electrodes;

forming a second substrate; and aligning and combining the first substrate and the second substrate into a cell, wherein the array structure layer is located between the backlight structure layer and the second substrate.

In some exemplary embodiments, the preparation method further includes:

forming a plurality of first spacer posts on the first substrate;

forming a plurality of second spacer posts on the second substrate;

wherein after the first substrate and the second substrate are aligned and combined into a cell, the first spacer posts and the second spacer posts are located between the first substrate and the second substrate and are in one-to-one correspondence with each other.

An embodiment of the present disclosure further provides a display apparatus including the display panel of any one of the aforementioned embodiments. The display apparatus mainly involve a curved display apparatus with a fixed curvature, including mobile phones, curved TV sets or curtain wall displays, etc.

Although the embodiments disclosed in the present disclosure are as described above, the described contents are only the embodiments for facilitating understanding of the present disclosure, which are not intended to limit the present disclosure. Without departing from the spirit and scope disclosed in the present disclosure, any person skilled in the art to which the present disclosure pertains can make any modifications and changes in the forms and details of implementation. However, the scope of patent protection of the present disclosure shall still be determined by the scope defined in the appended claims.

What we claim is:

1. A display panel, comprising: a first substrate and a second substrate which are aligned and combined into a cell, wherein
the first substrate comprises a backlight structure layer and an array structure layer arranged on a side of the backlight structure layer facing the second substrate,
the backlight structure layer comprises a light guide plate, a grating layer arranged on a side of the light guide plate facing the array structure layer, and a refractive layer covering the grating layer,
the grating layer comprises a plurality of grating units,
the array structure layer comprises a plurality of pixel electrodes, and
the grating units are in one-to-one correspondence with the pixel electrodes;
the display panel further comprising a plurality of first spacer posts arranged on a side of the first substrate facing the second substrate and a plurality of second spacer posts arranged on a side of the second substrate facing the first substrate, wherein the first spacer posts are in one-to-one correspondence with the second spacer posts;
wherein a first spacer post of the plurality of first spacer posts comprises a first support surface facing a second spacer post of the plurality of second spacer posts, the second spacer post comprises a second support surface facing the first spacer post, the display panel comprises a bent area comprising a first alignment region, and a second alignment region and a third alignment region which are arranged on a periphery of the first alignment region and concentric with the first alignment region;
the first alignment region comprises a pair of the first spacer post and the second spacer post, and in the first alignment region, a geometric center of the first support surface of the first spacer post is opposite to a geometric center of the second support surface of the second spacer post;
in any pair of the first spacer post and the second spacer post in the second alignment region, a distance between the geometric center of the first support surface of the first spacer post in the second alignment region and the geometric center of the first support surface of the first spacer post in the first alignment region is greater than a distance between the geometric center of the second support surface of the second spacer post in the second alignment region and the geometric center of the second support surface of the second spacer post in the first alignment region; and
in any pair of the first spacer post and the second spacer post in the third alignment region, a distance between the geometric center of the first support surface of the first spacer post in the third alignment region and the geometric center of the first spacer post in the first alignment region is smaller than a distance between the geometric center of the second support surface of the second spacer post in the third alignment region and the geometric center of the second support surface of the second spacer post in the first alignment region.

2. The display panel according to claim 1, wherein an orthographic projection of the pixel electrodes on the light guide plate comprises an orthographic projection of the grating units on the light guide plate.

3. The display panel according to claim 1, wherein a refractive index of the refractive layer is lower than that of the light guide plate.

4. The display panel according to claim 3, wherein a ratio of the refractive index of the light guide plate to the refractive index of the refractive layer is 1.08 to 1.54.

5. The display panel according to claim 1, wherein at least one of the plurality of grating units comprises a plurality of grid lines arranged in parallel, a period of the grating units is 150 nm to 600 nm, a height of the grid lines is 200 nm to 400 nm, and a line width of the grid lines is 200 nm to 300 nm.

6. The display panel according to claim 1, wherein a diffraction efficiency of the grating units is 20% to 30%.

7. The display substrate according to claim 6, wherein a material of the grating units is silicon nitride.

8. The display panel according to claim 1, wherein the first substrate further comprises a first flat layer arranged on a side of the array structure layer away from the backlight structure layer, and a color filter structure layer arranged on a side of the first flat layer away from the array structure layer, wherein the color filter structure layer comprises a plurality of color filter units, and the color filter units are in one-to-one correspondence with the pixel electrodes; or
the array structure layer comprises an active layer, a source-drain metal layer arranged on the active layer, an interlayer insulating layer covering the source-drain metal layer and a black matrix arranged on the interlayer insulating layer, wherein the source-drain metal layer comprises a source electrode and a drain electrode, an end of the source electrode adjacent to the drain electrode is overlapped on the active layer, an end of the drain electrode adjacent to the source electrode is overlapped on the active layer, a conductive channel is formed between the source electrode and the drain electrode, an orthographic projection of the black matrix on the light guide plate covers an orthographic projection of the conductive channel on the light guide plate, the first substrate further comprises a color filter structure layer arranged on the interlayer insulating layer and covering the black matrix, the color filter structure layer comprises a plurality of color filter units, and the color filter units are in one-to-one correspondence with the pixel electrodes.

9. The display panel according to claim 1, wherein a height of the first spacer posts in a direction perpendicular to the first substrate is smaller than a height of the second spacer posts in a direction perpendicular to the second substrate.

10. The display panel according to claim 1, wherein the bending area comprises a plurality of bending axes passing through the first alignment region, the pairs of the first spacer posts and the second spacer posts in the second alignment region and the third alignment region are distributed on the bending axes, and the bending axes comprise at least one group of a first bending axis and a second bending axis which are perpendicular to each other.

11. The display panel according to claim 1, wherein a refractive index of the light guide plate is 1.4 to 1.7, and a refractive index of the refractive layer is 1.1 to 1.3.

12. The display panel according to claim 1, wherein a material of the grating units comprises any one of aluminum, silver and gold.

13. The display panel according to claim 1, wherein the array structure layer further comprises a gate electrode and a common electrode arranged on a side of the refractive layer away from the light guide plate, a first insulating layer covering the gate electrode and the common electrode, an active layer arranged on the first insulating layer, a source-drain metal layer arranged on the active layer and a second insulating layer covering the source-drain metal layer, and the pixel electrodes are arranged on the second insulating layer.

14. The display panel according to claim 13, wherein the pixel electrodes are slit electrodes, the common electrodes are plate electrodes, the pixel electrodes are in one-to-one correspondence with the common electrodes, and an orthographic projection of the pixel electrodes on the light guide plate overlaps with an orthographic projection of the common electrodes on the light guide plate.

15. A display apparatus, comprising the display panel according to claim 1.

16. A display panel, comprising: a first substrate and a second substrate which are aligned and combined into a cell, wherein
the first substrate comprises a backlight structure layer and an array structure layer arranged on a side of the backlight structure layer facing the second substrate,
the backlight structure layer comprises a light guide plate, a grating layer arranged on a side of the light guide plate facing the array structure layer, and a refractive layer covering the grating layer,
the grating layer comprises a plurality of grating units,
the array structure layer comprises a plurality of pixel electrodes, and
the grating units are in one-to-one correspondence with the pixel electrodes;
the display panel further comprising a plurality of first spacer posts arranged on a side of the first substrate facing the second substrate and a plurality of second spacer posts arranged on a side of the second substrate facing the first substrate, wherein the first spacer posts are in one-to-one correspondence with the second spacer posts;
wherein a first spacer post of the plurality of first spacer posts comprises a first support surface facing a second spacer post of the plurality of second spacer posts, the second spacer post comprises a second support surface facing the first spacer post, the display panel comprises a bent area comprising a first alignment region, a second alignment region and a third alignment region, the bending area comprises a bending axis located in the first alignment region, and the second alignment region and the third alignment region are arranged on at least one side of the first alignment region along a direction perpendicular to the bending axis;
the first alignment region comprises a row of pairs of the first spacer posts and the second spacer posts arranged along a direction of the bending axis, and in any pair of the first spacer post and second spacer post in the first alignment region, the geometric center of the first support surface of the first spacer post and the geometric center of the second support surface of the second spacer post are opposite and located in a plane that is perpendicular to the first substrate and the second substrate and comprises the bending axis;
in the direction perpendicular to the bending axis in the second alignment region, in any pair of the first spacer post and second spacer post, a distance between the geometric center of the first support surface of the first spacer post in the second alignment region and the geometric center of the first support surface of the first spacer post in the first alignment region is greater than a distance between the geometric center of the second support surface of the second spacer post in the second alignment region and the geometric center of the second support surface of the second spacer post in the first alignment region; and
in the direction perpendicular to the bending axis in the third alignment region, in any pair of the first spacer post and second spacer post, a distance between the geometric center of the first support surface of the first spacer post in the third alignment region and the geometric center of the first spacer post in the first alignment region is smaller than a distance between the geometric center of the second support surface of the second spacer post in the third alignment region and the geometric center of the second support surface of the second spacer post of in the first alignment region.

17. A display apparatus, comprising the display panel according to claim 16.

18. The display panel according to claim 16, wherein an orthographic projection of the pixel electrodes on the light guide plate comprises an orthographic projection of the grating units on the light guide plate.

19. The display panel according to claim 16, wherein a refractive index of the refractive layer is lower than that of the light guide plate.

20. A preparation method of a display panel, comprising:
forming a first substrate comprising a backlight structure layer and an array structure layer arranged on the backlight structure layer, wherein the backlight structure layer comprises a light guide plate, a grating layer arranged on a side of the light guide plate facing the array structure layer and a refractive layer covering the grating layer, the grating layer comprises a plurality of grating units, the array structure layer comprises a plurality of pixel electrodes, and the grating units are in one-to-one correspondence with the pixel electrodes;
forming a second substrate;
aligning and combining the first substrate and the second substrate into a cell, wherein the array structure layer is located between the backlight structure layer and the second substrate;
forming a plurality of first spacer posts on the first substrate; and
forming a plurality of second spacer posts on the second substrate;
wherein after the first substrate and the second substrate are aligned and combined into a cell, the first spacer posts and the second spacer posts are located between the first substrate and the second substrate and are in one-to-one correspondence with each other;
wherein a first spacer post of the plurality of first spacer posts comprises a first support surface facing a second spacer post of the plurality of second spacer posts, the second spacer post comprises a second support surface facing the first spacer post, the display panel comprises a bent area comprising a first alignment region, and a second alignment region and a third alignment region which are arranged on a periphery of the first alignment region and concentric with the first alignment region;
the first alignment region comprises a pair of the first spacer post and the second spacer post, and in the first alignment region, a geometric center of the first support surface of the first spacer post is opposite to a geometric center of the second support surface of the second spacer post;
in any pair of the first spacer post and the second spacer post in the second alignment region, a distance between the geometric center of the first support surface of the first spacer post in the second alignment region and the geometric center of the first support surface of the first spacer post in the first alignment region is greater than a distance between the geometric center of the second support surface of the second spacer post in the second alignment region and the geometric center of the second support surface of the second spacer post in the first alignment region; and in any pair of the first spacer post and the second spacer post in the third alignment region, a distance between the geometric center of the first support surface of the first spacer post in the third alignment region and the geometric center of the first spacer post in the first alignment region is smaller than a distance between the geometric center of the second support surface of the second spacer post in the third alignment region and the geometric center of the second support surface of the second spacer post in the first alignment region.

* * * * *